(12) United States Patent
Yajima et al.

(10) Patent No.: US 9,715,113 B2
(45) Date of Patent: Jul. 25, 2017

(54) HEAD-MOUNTED DISPLAY DEVICE, CONTROL METHOD FOR HEAD-MOUNTED DISPLAY DEVICE, AND COMPUTER PROGRAM

(71) Applicant: SEIKO EPSON CORPORATION, Tokyo (JP)

(72) Inventors: Kenro Yajima, Matsumoto (JP); Shinichi Kobayashi, Azumino (JP); Naoto Aruga, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 55 days.

(21) Appl. No.: 14/626,103

(22) Filed: Feb. 19, 2015

(65) Prior Publication Data

US 2015/0268473 A1    Sep. 24, 2015

(30) Foreign Application Priority Data

Mar. 18, 2014 (JP) .................................. 2014-054395
Nov. 4, 2014 (JP) .................................. 2014-224114

(51) Int. Cl.
  *G09G 5/00*    (2006.01)
  *G02B 27/01*   (2006.01)
  *G02B 27/00*   (2006.01)
  *G06T 19/00*   (2011.01)

(52) U.S. Cl.
  CPC ..... *G02B 27/0172* (2013.01); *G02B 27/0093* (2013.01); *G06T 19/006* (2013.01); *G02B 2027/014* (2013.01); *G02B 2027/0138* (2013.01)

(58) Field of Classification Search
  None
  See application file for complete search history.

(56) References Cited

U.S. PATENT DOCUMENTS

| | | | |
|---|---|---|---|
| 2003/0193497 A1* | 10/2003 | Yhann | G06T 7/0085 345/419 |
| 2005/0036054 A1 | 2/2005 | Mino et al. | |
| 2010/0254592 A1* | 10/2010 | Cheng | G06T 7/0075 382/154 |
| 2010/0259619 A1* | 10/2010 | Nicholson | H04N 7/185 348/158 |

(Continued)

FOREIGN PATENT DOCUMENTS

| | | |
|---|---|---|
| JP | 2003-316510 A | 11/2003 |
| JP | 2005-122100 A | 5/2005 |
| JP | 2011-259341 A | 12/2011 |

*Primary Examiner* — Frank Chen
(74) *Attorney, Agent, or Firm* — Oliff PLC

(57) ABSTRACT

A head-mounted display device with which a user can visually recognize a virtual image and an outside scene includes an outside-scene acquiring unit configured to acquire outside scene information including at least a feature of the outside scene in a visual field direction of the user, a position estimating unit configured to estimate, on the basis of at least two kinds of the outside scene information acquired by the outside-scene acquiring unit over time, a position of any target object present in a real world, and an augmented-reality processing unit configured to cause the image display unit to form, on the basis of the estimated position of the target object, the virtual image representing a virtual object to be added to the target object.

15 Claims, 15 Drawing Sheets

(56) References Cited

U.S. PATENT DOCUMENTS

| | | | | |
|---|---|---|---|---|
| 2011/0025829 A1* | 2/2011 | McNamer | ............ | H04N 13/021 |
| | | | | 348/50 |
| 2011/0096175 A1* | 4/2011 | Chang | ................ | H04N 5/23206 |
| | | | | 348/207.1 |
| 2011/0229012 A1* | 9/2011 | Singhal | .............. | G06K 9/00201 |
| | | | | 382/154 |
| 2012/0127302 A1* | 5/2012 | Imai | ................... | H04N 1/00323 |
| | | | | 348/135 |
| 2014/0139551 A1* | 5/2014 | McCulloch | ............ | G09G 5/377 |
| | | | | 345/633 |
| 2014/0267400 A1* | 9/2014 | Mabbutt | ............... | G06T 19/006 |
| | | | | 345/633 |

* cited by examiner

HEAD-MOUNTED DISPLAY DEVICE, CONTROL METHOD FOR HEAD-MOUNTED DISPLAY DEVICE, AND COMPUTER PROGRAM

BACKGROUND

1. Technical Field

The present invention relates to a head-mounted display device.

2. Related Art

There is known a head-mounted display device mounted on the head of an observer and used to form a virtual image in a visual field area of the observer. The head-mounted display device is also called head mounted display (HMD). As the head-mounted display device, there are a non-transmissive head-mounted display device that blocks the visual field of a user in a mounted state and a transmissive head-mounted display device that does not block the visual field of a user in a mounted state.

On the other hand, there is known a technique called augmented reality (AR) for additionally presenting information in a real environment using a computer. In order to realize the augmented reality in the transmissive head-mounted display device, the transmissive head-mounted display device causes a liquid crystal display to display only information for additional presentation (e.g., characters and images) for decorating an object present in the real world. A user can bodily sense the augmented reality by visually recognizing both of the information for additional presentation displayed as a virtual image via the liquid crystal display and an outside scene of the real world seen via lenses in front of the eyes.

When the augmented reality is realized by the transmissive head-mounted display device in this way, if a deviation between a position where the information for additional presentation is displayed as a virtual image and the object in the real world increases, the user feels a sense of discomfort. Therefore, there is a demand for grasping the position of the object in the real world when the augmented reality is realized. JP-A-2003-316510 (Patent Literature 1) describes a technique for grasping the position of the object in the real world using a stereo camera configured by a camera with two or more lenses.

In a technique described in Patent literature 1, the camera with two or more lenses is necessary to grasp the position of the object in the real world. Techniques described in JP-A-2011-259341 (Patent Literature 2) and JP-A-2005-122100 (Patent Literature 3) do not take into account that the position of the object in the real world is grasped in the head-mounted display device. Note that such problems occur not only when the position of the object in the real world is grasped using an image of an outside scene acquired by the camera but also when the position of the object in the real world is grasped using information concerning an outside scene (hereinafter referred to as "outside scene information") acquired by other means (e.g., an infrared sensor).

Therefore, there is a demand for a head-mounted display device capable of grasping the position of the object in the real world using single outside scene information acquiring means. Besides, there is a demand for a reduction in size, a reduction in costs, resource saving, facilitation of manufacturing, improvement of usability, and the like for the head-mounted display device.

SUMMARY

An advantage of some aspects of the invention is to solve at least a part of the problems described above, and the invention can be implemented as the following aspects.

(1) An aspect of the invention provides a head-mounted display device with which a user can visually recognize a virtual image and an outside scene. The head-mounted display device includes: an image display unit configured to cause the user to visually recognize the virtual image; an outside-scene acquiring unit configured to acquire outside scene information including at least a feature of the outside scene in a visual field direction of the user; a position estimating unit configured to estimate, on the basis of at least two kinds of the outside scene information acquired by the outside-scene acquiring unit over time, the position of any target object present in a real world; and an augmented-reality processing unit configured to cause the image display unit to form, on the basis of the estimated position of the target object, the virtual image representing a virtual object to be added to the target object. With the head-mounted display device in this aspect, the position estimating unit estimates the position of the target object with respect to the outside-scene acquiring unit on the basis of the at least two kinds of outside scene information acquired by the outside-scene acquiring unit over time. Therefore, it is possible to provide the head-mounted display device capable of grasping the position of any target object present in the real world using single outside scene information acquiring means (e.g., a monocular camera). The augmented-reality processing unit causes the image display unit to form, on the basis of the estimated position of the target object, the virtual image representing the virtual object to be added to the target object. Therefore, it is possible to reduce a deviation between the target object, which is an object in the real world, and the virtual object displayed as the virtual image.

(2) In the head-mounted display device according to the aspect described above, the position estimating unit may estimate the position of the target object using first outside scene information and second outside scene information acquired according to a movement amount of the outside-scene acquiring unit after acquisition of the first outside scene information. With the head-mounted display device according to this aspect, it is possible to improve accuracy of the estimation of the position of the target object in the position estimating unit. For example, when the movement amount of the outside-scene acquiring unit is equal to or larger than a predetermined amount, the position estimating unit acquires the second outside scene information. Then, if the predetermined amount is designed as appropriate, the position estimating unit can estimate the position of the target object using the first outside scene information in which a difference between features of the outside scene included in the outside scene information is large and the second outside scene information.

(3) The head-mounted display device according to the aspect described above may further include a first motion detecting unit configured to detect motion of the head of the user. The position estimating unit may estimate the movement amount of the outside-scene acquiring unit from the motion of the head detected by the first motion detecting unit. With the head-mounted display device according to this aspect, the position estimating unit can estimate the movement amount of the outside-scene acquiring unit using the motion of the head of the user and acquire the second outside scene information. Therefore, the position estimating unit can estimate the position of the target object using a difference between features of the outside scene included the first and second outside scene information caused when the user moves the head.

(4) The head-mounted display device according to the aspect described above may further include a second motion detecting unit configured to detect motion of the body of the user. The position estimating unit may estimate the movement amount of the outside-scene acquiring unit from the motion of the body detected by the second motion detecting unit. With the head-mounted display device according to this aspect, the position estimating unit can estimate the movement amount of the outside-scene acquiring unit using the motion of the body of the user and acquire the second outside scene information. Therefore, the position estimating unit can estimate the position of the target object using a difference between features of the outside scene included the first and second outside scene information caused when the user moves the body.

(5) The head-mounted display device according to the aspect described above may further include a present-position acquiring unit configured to acquire present position information of the user. The position estimating unit may estimate the movement amount of the outside-scene acquiring unit from the present position information acquired by the present-position acquiring unit. With the head-mounted display device according to this aspect, the position estimating unit can estimate the movement amount of the outside-scene acquiring unit using the present position information of the user and acquire the second outside scene information. Therefore, even in a head-mounted display device not including a component configured to detect motion of the user (motion of the head or motion of the body), the position estimating unit can acquire the second outside scene information.

(6) The head-mounted display device according to the aspect described above may further include an inducing unit configured to cause the image display unit to form the virtual image for inducing motion of the user. With the head-mounted display device according to this aspect, the inducing unit induces motion of the user (motion of the head or motion of the body). Therefore, the position estimating unit can easily acquire the second outside scene information.

(7) In the head-mounted display device according to the aspect described above, the position estimating unit may estimate the position of the target object using first outside scene information and second outside scene information acquired according to a difference between features of the outside scene included in the outside scene information after acquisition of the first outside scene. With the head-mounted display device according to this aspect, it is possible to improve accuracy of the estimation of the position of the target object in the position estimating unit. For example, when the difference between the features of the outside scene included in the outside scene information is equal to or larger than a predetermined amount, the position estimating unit acquires the second outside scene information. Then, if the predetermined amount is designed as appropriate, the position estimating unit can estimate the position of the target object using the first outside scene information in which the difference between the features of the outside scene included in the outside scene information is large and the second outside scene information.

(8) In the head-mounted display device according to the aspect described above, the position estimating unit may calculate a parallax between the first outside scene information and the second outside scene information and estimate the position of the target object using the calculated parallax, the movement amount of the outside-scene acquiring unit, and a focal length of the outside-scene acquiring unit. With the head-mounted display device according to this aspect, the position estimating unit can estimate the position of the target object using the parallax between the first outside scene information and the second outside scene information, the movement amount of the outside-scene acquiring unit, and the focal length of the outside-scene acquiring unit.

(9) In the head-mounted display device according to the aspect described above, the position estimating unit may calculate the parallax with reference to an edge of the target object included in the first outside scene information and an edge of the target object included in the second outside scene information. With the head-mounted display device according to this aspect, the position estimating unit calculates the parallax with reference to the edges of the target object included in the first and second outside scene information. Therefore, the position estimating unit can accurately calculate the parallax between the first outside scene information and the second outside scene information.

(10) In the head-mounted display device according to the aspect described above, the image display unit may include an optical-image display unit configured to form the virtual image in front of the eye of the user. The position estimating unit may further calculate the position of the optical image corresponding to an extended line of the estimated position of the target object and the position of the eye of the user. The augmented-reality processing unit may determine the position of the virtual object on the basis of the calculated position of the optical-image display unit. With the head-mounted display device according to this aspect, the augmented-reality processing unit determines the position of the virtual object on the basis of the position of the optical-image display unit corresponding to the extended line of the position of the target object and the position of the eye of the user. That is, the augmented-reality processing unit can determine the position of the virtual object on the basis of the position of the target object visually recognized by the user through the optical-image display unit. As a result, the augmented-reality processing unit can display, in a position where the user does not feel a sense of discomfort, the virtual object to be added to the target object.

(11) The head-mounted display device according to the aspect described above may further include an eye-image acquiring unit configured to acquire an image of the eye of the user. The position estimating unit may analyze the image of the eye acquired by the eye-image acquiring unit, acquire the size of the eye of the user, and estimate the position of the eye of the user on the basis of the acquired size of the eye. With the head-mounted display device according to this aspect, the position estimating unit can estimate the position of the eye of the user on the basis of the image of the eye acquired by the eye-image acquiring unit.

(12) In the head-mounted display device according to the aspect described above, the eye-image acquiring unit may be arranged near the outside-scene acquiring unit. With the head-mounted display device according to this aspect, the eye-image acquiring unit is arranged near the outside-scene acquiring unit. Therefore, it is possible to improve accuracy of the estimation of the position of the eye of the user by the position estimating unit.

Not all of a plurality of constituent elements in the aspects of the invention are essential. In order to solve a part or all of the problems described above or in order to attain apart or all of effects described in this specification, it is possible to perform a change, deletion, replacement with new constituent elements, and partial deletion of limited contents concerning a part of the plurality of constituent elements as appropriate. In order to solve a part or all of the problems described above or in order to attain a part or all of the effects described in this specification, it is also possible to combine apart or all of technical features included in one aspect of the invention described above with a part or all of technical features included in the other aspects of the invention described above to obtain an independent aspect of the invention.

For example, one aspect of the invention can be implemented as a device including a part or all of the four components, i.e., the image display unit, the outside-scene acquiring unit, the augmented-reality processing unit, and the position estimating unit. That is, the device may or may not include the image display unit. The device may or may not include the outside-scene acquiring unit. The device may or may not include the augmented-reality processing unit. The device may or may not include the position estimating unit. Such a device can be implemented as, for example, a head-mounted display device but can also be implemented as devices other than the head-mounted display device. A part or all of the technical features of the aspects of the head-mounted display device can be applied to the device.

Note that the invention can be implemented in various forms. The invention can be implemented in forms of, for example, a head-mounted display device, a control method for the head-mounted display device, a head-mounted display system, a computer program for implementing functions of the method, the device, or the system, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment
A-1. Configuration of a Head-Mounted Display Device

Figure 1:
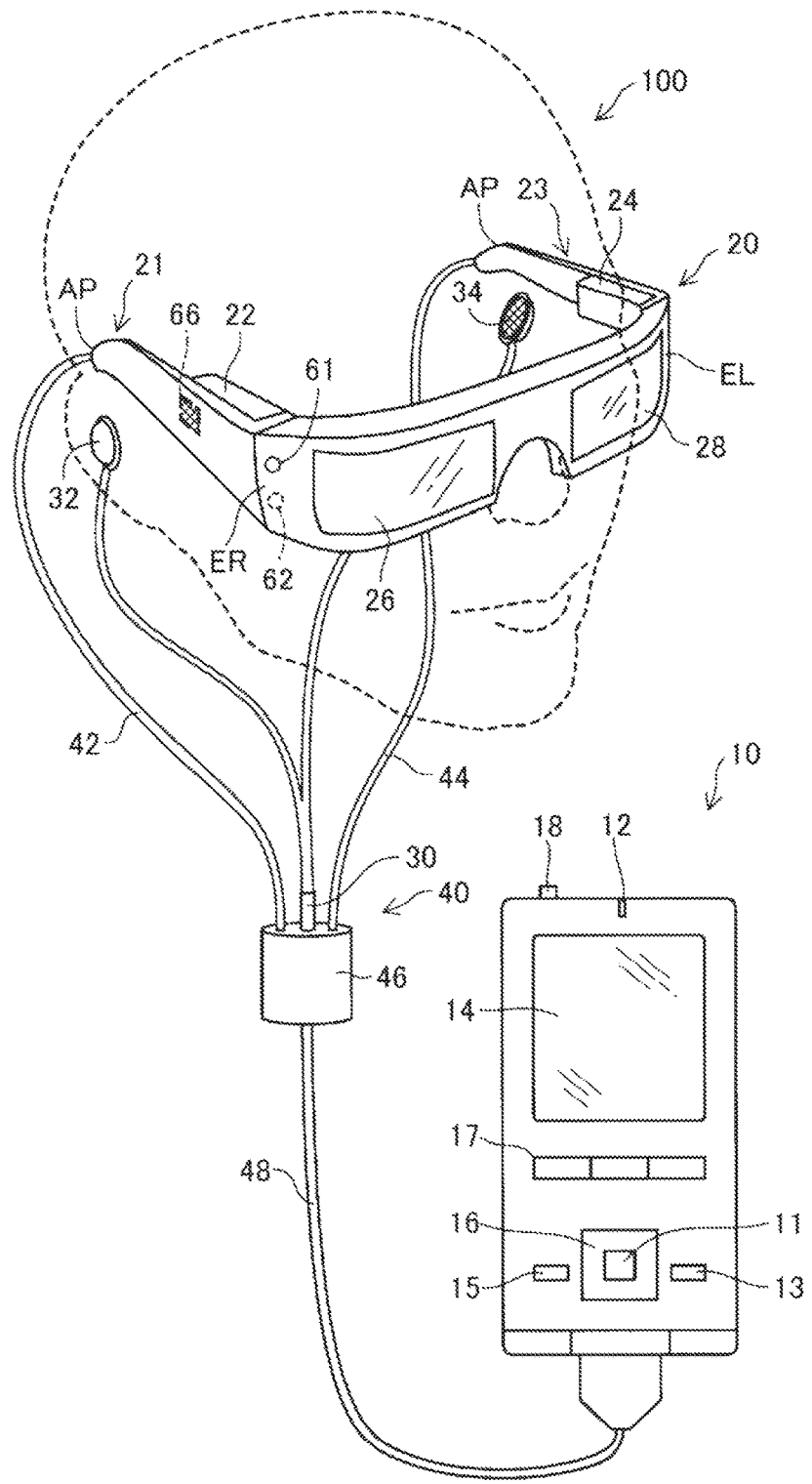
FIG. 1 is an explanatory diagram showing the schematic configuration of a head-mounted display device in an embodiment of the invention.

FIG. 1 is an explanatory diagram showing the schematic configuration of a head-mounted display device in an embodiment of the invention. A head-mounted display device 100 is a display device mounted on a head and is also called head mounted display (HMD). The HMD 100 in this embodiment is an optically transmissive head-mounted display device with which a user can visually recognize a virtual image and at the same time directly visually recognize an outside scene. Note that, in this embodiment, the virtual image visually recognized by the user using the HMD 100 is also referred to as "displayed image" for convenience. Emitting image light generated on the basis of image data is also referred to as "display an image".

The HMD 100 includes an image display unit 20 that causes the user to visually recognize the virtual image in a state in which the image display unit 20 is worn on the head of the user and a control unit (a controller) 10 that controls the image display unit 20.

The image display unit 20 is a wearing body worn on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, an outer camera 61, an inner camera 62, and a nine-axis sensor 66. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end portion ER, which is the other end of the right optical-image display unit 26, to a position corresponding to the temporal region of the user when the user wears the image display unit 20. Similarly, the left holding unit 23 is a member provided to extend from an end portion EL, which is the other end of the left optical-image display unit 28, to a position corresponding to the temporal region of the user when the user wears the image display unit 20. The right holding unit 21 and the left holding unit 23 hold the image display unit 20 on the head of the user like temples of eyeglasses.

The right display driving unit 22 is arranged on the inner side of the right holding unit 21, in other words, a side opposed to the head of the user when the user wears the image display unit 20. The left display driving unit 24 is arranged on the inner side of the left holding unit 23. Note that, in the following explanation, the right holding unit 21 and the left holding unit 23 are also collectively simply referred to as "holding units". The right display driving unit 22 and the left display driving unit 24 are also collectively simply referred to as "display driving units". The right optical-image display unit 26 and the left optical-image display unit 28 are also collectively simply referred to as "optical-image display units".

The display driving units include liquid crystal displays (hereinafter referred to as "LCDs") 241 and 242 and projection optical systems 251 and 252 (see FIG. 2). Details of the configuration of the display driving units are explained below. The optical-image display units functioning as optical members include light guide plates 261 and 262 (see FIG. 2) and dimming plates. The light guide plates 261 and 262 are formed of a light transmissive resin material or the like and guide image lights output from the display driving units to the eyes of the user. The dimming plates are thin plate-like optical elements and are arranged to cover the front side (a side opposite to the side of the eyes of the user) of the image display unit 20. The dimming plates protect the light guide plates 261 and 262 and suppress damage, adhesion of soil, and the like to the light guide plates 261 and 262. By adjusting the light transmittance of the dimming plates, it is possible to adjust an external light amount entering the eyes of the user and adjust easiness of visual recognition of the virtual image. Note that the dimming plates can be omitted.

The outer camera 61 is arranged in a position corresponding to the right temple of the user when the user wears the image display unit 20. The outer camera 61 picks up an image of an outside scene (a scene on the outside) in the front side direction of the image display unit 20, in other words, a visual field direction of the user in a state in which the HMD 100 is worn and acquires an outside scene image. The outer camera 61 is a so-called visible light camera. The outside scene image acquired by the outer camera 61 is an image representing the shape of an object from visible light emitted from the object. The outer camera 61 functions as an "outside-scene acquiring unit" and "outside-scene-information acquiring means". The outside scene image functions as "outside scene information".

Note that, as the outside-scene acquiring unit, any configuration can be adopted as long as the outside-scene acquiring unit can acquire "outside scene information" including at least features of the outside scene in the visual field direction of the user. For example, the outside-scene acquiring unit may be configured by an infrared sensor, an ultrasonic sensor, a radar, or the like instead of the visible light camera. In this case, a detection value by the sensor or the radar functions as the "features of the outside scene".

The inner camera 62 is arranged in a position corresponding to the right temple of the user when the user wears the image display unit 20. The inner camera 62 picks up an image of the rear side direction of the image display unit 20, in other words, the left and right eyes of the user in the state in which the HMD 100 is worn and acquires an image of the eyes of the user. The inner camera 62 is a so-called visible light camera like the outer camera 61. The inner camera 62 functions as an "eye-image acquiring unit". The inner camera 62 is used for estimating the distance between the outer camera 61 and the eyes of the user in augmented reality processing. Therefore, the inner camera 62 is preferably arranged near the outer camera 61.

The nine-axis sensor 66 is arranged in a position corresponding to the right temple of the user when the user wears the image display unit 20. The nine-axis sensor 66 is a motion sensor that detects acceleration (three axes), angular velocity (three axes), and terrestrial magnetism (three axes). The nine-axis sensor 66 is provided in the image display unit 20. Therefore, when the image display unit 20 is worn on the head of the user, the nine-axis sensor 66 functions as a "first motion detecting unit" that detects motion of the head of the user. The motion of the head includes the velocity, the acceleration, the angular velocity, the direction, and a change in the direction of the head.

The image display unit 20 further includes a connecting unit 40 for connecting the image display unit 20 to the control unit 10. The connecting unit 40 includes a main body cord 48 connected to the control unit 10, a right cord 42 and a left cord 44, which are two cords branching from the main body cord 48, and a coupling member 46 provided at a branching point. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. A jack for connecting an earphone plug 30 is provided in the coupling member 46. A right earphone 32 and a left earphone 34 extend from the earphone plug 30.

The image display unit 20 and the control unit 10 perform transmission of various signals via the connecting unit 40. Connectors (not shown in the figure), which fit with each other, are respectively provided at an end of the main body cord 48 on the opposite side of the coupling member 46 and in the control unit 10. The control unit 10 and the image display unit 20 are connected and disconnected according to fitting and unfitting of the connector of the main body cord 48 and the connector of the control unit 10. For example, a metal cable or an optical fiber can be adopted as the right cord 42, the left cord 44, and the main body cord 48.

The control unit 10 is a device for controlling the HMD 100. The control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining contents of the operation in the control unit 10. The lighting unit 12 notifies, with a light emission state thereof, an operation state of the HMD 100. As the operation state of the HMD 100, there is, for example, ON/OFF of a power supply. As the lighting unit 12, for example, an LED (Light Emitting Diode) is used. The display switching key 13 detects pressing operation and outputs, for example, a signal for switching a display mode of a content moving image to 3D and 2D.

The track pad 14 detects operation by a finger of the user on an operation surface of the track pad 14 and outputs a signal corresponding to detected content. As the track pad 14, various types such as an electrostatic type, a pressure type, and an optical type can be adopted. The luminance switching key 15 detects pressing operation and outputs a signal for increasing or reducing the luminance of the image display unit 20. The direction key 16 detects pressing operation on keys corresponding to the up, down, left, and right directions and outputs a signal corresponding to detected content. The power switch 18 detects slide operation of the switch to switch a power supply state of the HMD 100.

Figure 2:
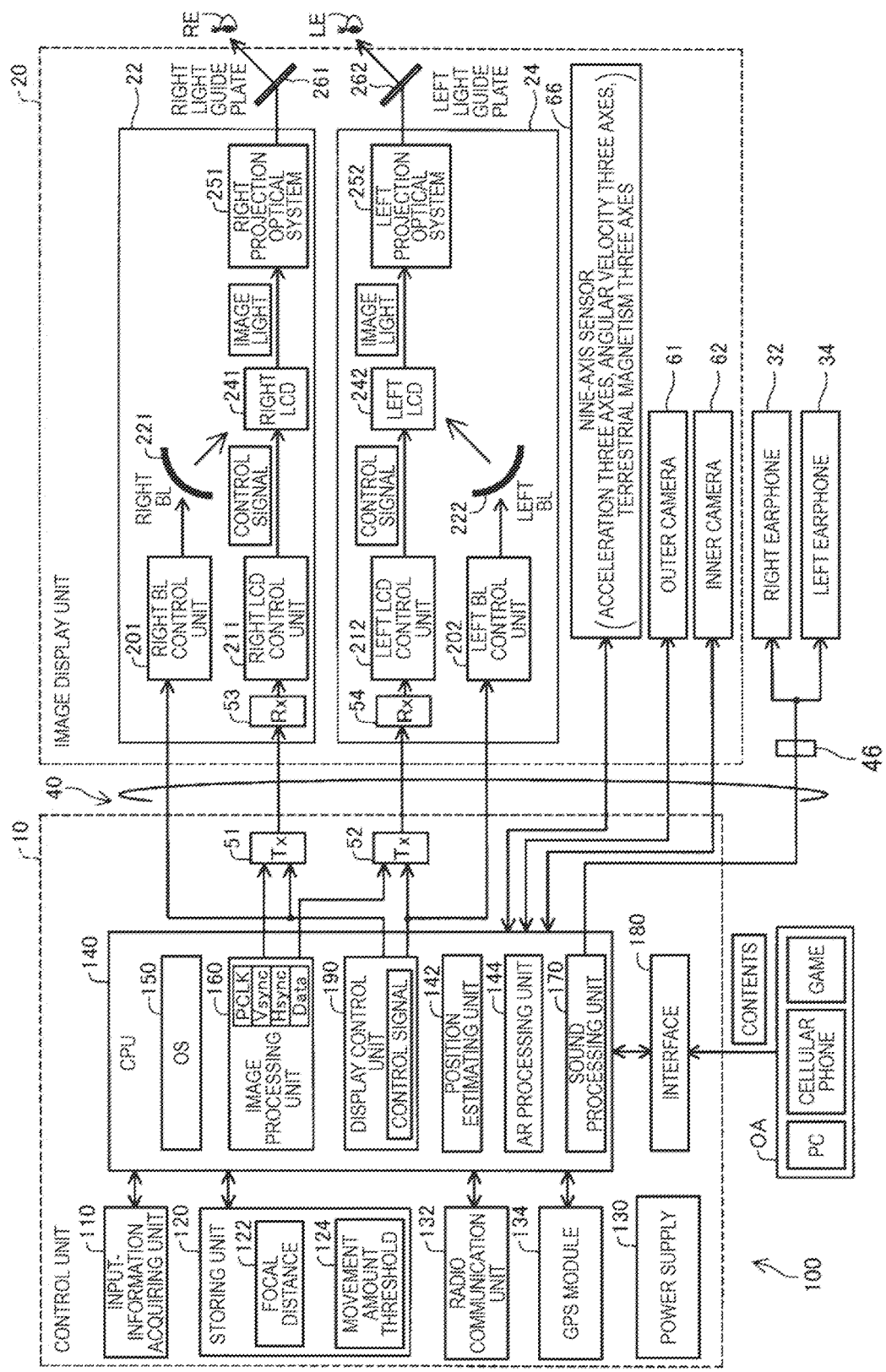
FIG. 2 is a block diagram functionally showing the configuration of the HMD.

FIG. 2 is a block diagram functionally showing the configuration of the HMD 100. The control unit 10 includes an input-information acquiring unit 110, a storing unit 120, a power supply 130, a radio communication unit 132, a GPS module 134, a CPU 140, an interface 180, and transmitting units (Tx) 51 and 52. The units are connected to one another by a not-shown bus.

The input-information acquiring unit 110 acquires signals corresponding to operation input to the determination key 11, the display switching key 13, the track pad 14, the luminance switching key 15, the direction key 16, the menu key 17, and the power switch 18. Note that the input-information acquiring unit 110 can acquire operation inputs by various methods other than the operation inputs explained above. For example, the input-information acquiring unit 110 may acquire an operation input by a foot switch (a switch operated by the foot of the user). For example, a visual-line detecting unit such as an infrared sensor may be provided in the image display unit 20. The visual-line detecting unit may detect a visual line of the user and acquire an operation input by a command associated with movement of the visual line. For example, a gesture of the user may be detected using the outer camera 61. An operation input by a command associated with the gesture may be acquired. In the gesture detection, a fingertip of the user, a ring worn on the hand of the user, a medical instrument held by the user, or the like can be used as a mark for motion detection. If the operation input by the foot switch or the visual line can be acquired, even in work in which it is difficult for the user to release the hands, the input-information acquiring unit 110 can acquire the operation input from the user.

The storing unit 120 is configured by a ROM, a RAM, a DRAM, a hard disk, or the like. Various computer programs such as an operating system (OS) are stored in the storing unit 120. The storing unit 120 includes a focal length 122 and a movement amount threshold 124.

The focal length 122 is a storage area for storing a focal length of the outer camera 61 in advance. As the focal length of the outer camera 61 stored in the focal length 122, a predetermined value is stored as a default value. The predetermined value stored in the focal length 122 may be changed by the user. In the movement amount threshold 124, threshold representing "a movement amount of the outer camera 61" for performing second image pickup by the outer camera 61 in augmented reality processing explained below is stored. The threshold stored in the movement amount threshold 124 may be changed by the user.

The power supply 130 supplies electric power to the units of the HMD 100. As the power supply 130, for example, a secondary cell can be used. The radio communication unit 132 performs radio communication with other apparatuses according to a predetermined radio communication standard such as a wireless LAN or a Bluetooth (registered trademark). The GPS module 134 receives a signal from a GPS satellite to thereby detect the present position of the user of the HMD 100 and generates present position information representing present position information of the user. The present position information can be implemented by, for example, coordinates representing latitude and longitude.

The CPU 140 reads out and executes a computer program stored in the storing unit 120 to thereby function as an OS 150, an image processing unit 160, a sound processing unit 170, a display control unit 190, a position estimating unit 142, and an AR (Augmented Reality) processing unit 144.

The position estimating unit 142 estimates the position of an object, which is present in the real world, with respect to the outer camera 61 in the augmented reality processing explained below. The position estimating unit 142 estimates position of a right eye RE and a left eye LE of the user with respect to the outer camera 61 in the augmented reality processing. The AR processing unit 144 cooperates with the position estimating unit 142 to thereby realize the augmented reality processing. The augmented reality processing is processing for realizing augmented reality, in other words, processing for displaying an image representing information for additional presentation (e.g., characters and images) for expanding (adding) the object in the real world. Note that the AR processing unit 144 is equivalent to an "augmented-reality processing unit".

The image processing unit 160 generates a signal on the basis of contents (a video) input via the interface 180 or the radio communication unit 132. The image processing unit 160 supplies the generated signal to the image display unit 20 via the connecting unit 40. The signal to be supplied to the image display unit 20 is different in an analog format and a digital format. In the case of the analog format, the image processing unit 160 acquires an image signal included in the contents, separates synchronization signals such as a vertical synchronization signal VSync and a horizontal synchronization signal HSync from the acquired image signal, and generates a clock signal PCLK with a PLL circuit or the like according to cycles of the synchronization signals. The image processing unit 160 converts an analog image signal, from which the synchronization signals are separated, into a digital image signal using an A/D conversion circuit or the like. The image processing unit 160 stores the digital image signal after the conversion in a DRAM in the storing unit 120 frame by frame as image data Data of RGB data. On the other hand, in the case of the digital format, the image processing unit 160 generates and transmits the clock signal PCLK and the image data Data. Specifically, when the contents are the digital format, the clock signal PCLK is output in synchronization with the image signal. Therefore, the generation of the vertical synchronization signal VSync and the horizontal synchronization signal HSync and the A/D conversion for the analog image signal are unnecessary. Note that the image processing unit 160 may execute, on the image data Data stored in the storing unit 120, image processing such as resolution conversion processing, various kinds of tone correction processing for adjustment of luminance and chroma, and keystone correction processing.

The image processing unit 160 transmits the clock signal PCLK, the vertical synchronization signal VSync, and the horizontal synchronization signal HSync generated by the image processing unit 160 and the image data Data stored in the DRAM in the storing unit 120 respectively via the transmitting units 51 and 52. Note that the image data Data transmitted via the transmitting unit 51 is referred to as "image data for right eye Data1" as well. The image data Data transmitted via the transmitting unit 52 is referred to as "image data for left eye Data2" as well. The transmitting units 51 and 52 function as a transceiver for serial transmission between the control unit 10 and the image display unit 20.

The display control unit 190 generates control signals for controlling the right display driving unit 22 and the left display driving unit 24. Specifically, the display control unit 190 individually controls, using the control signals, ON/OFF of driving of the right and left LCDs 241 and 242 by right and left LCD control units 211 and 212 and ON/OFF of driving of right and left backlights 221 and 222 by the right and left backlight control units 201 and 202 to thereby control generation and emission of image lights by the right display driving unit 22 and the left display driving unit 24. The display control unit 190 transmits control signals for the right LCD control unit 211 and the left LCD control unit 212 respectively via the transmitting units 51 and 52. The display control unit 190 respectively transmits control signals for the right backlight control unit 201 and the left backlight control unit 202.

The sound processing unit 170 acquires a sound signal included in the contents, amplifies the acquired sound signal, and supplies the amplified sound signal to a not-shown speaker in the right earphone 32 or a not-shown speaker in the left earphone 34 connected to the coupling member 46. Note that, for example, when a Dolby (registered trademark) system is adopted, processing for the sound signal is performed. Different sounds, the frequencies or the like of which are varied, are respectively output from the right earphone 32 and the left earphone 34.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, the outer camera 61, the inner camera 62, and the nine-axis sensor 66.

The right display driving unit 22 includes a receiving unit (Rx) 53, the right backlight (BL) control unit 201 and the right backlight (BL) 221 functioning as a light source, the right LCD control unit 211 and the right LCD 241 functioning as a display element, and the right projection optical system 251. Note that the right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and the image data for right eye Data1 input via the receiving unit 53. The right LCD 241 is a transmissive liquid crystal panel on which a plurality of pixels are arranged in a matrix shape.

The right projection optical system 251 is configured by a collimate lens that changes the image light emitted from the right LCD 241 to light beams in a parallel state. The right light guide plate 261 functioning as the right optical-image display unit 26 guides the image light output from the right projection optical system 251 to the right eye RE of the user while reflecting the image light along a predetermined optical path. For the optical-image display unit, any system can be used as long as the optical-image display unit forms a virtual image in front of the eyes of the user using the image light. For example, a diffraction grating may be used or a semitransparent reflection film may be used.

The left display driving unit 24 includes a configuration same as the configuration of the right display driving unit 22. That is, the left display driving unit 24 includes a receiving unit (Rx) 54, the left backlight (BL) control unit 202 and the left backlight (BL) 222 functioning as a light source, the left LCD control unit 212 and the left LCD 242 functioning as a display element, and the left projection optical system 252. Detailed explanation is omitted.

Figure 3A:
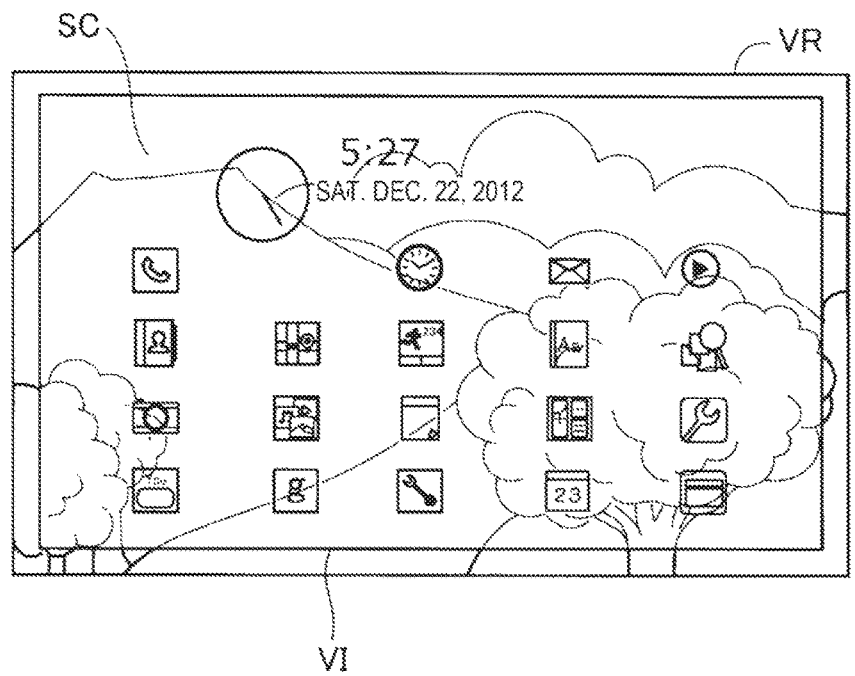
FIGS. 3A and 3B are explanatory diagrams showing an example of a virtual image visually recognized by a user.
Figure 3B:
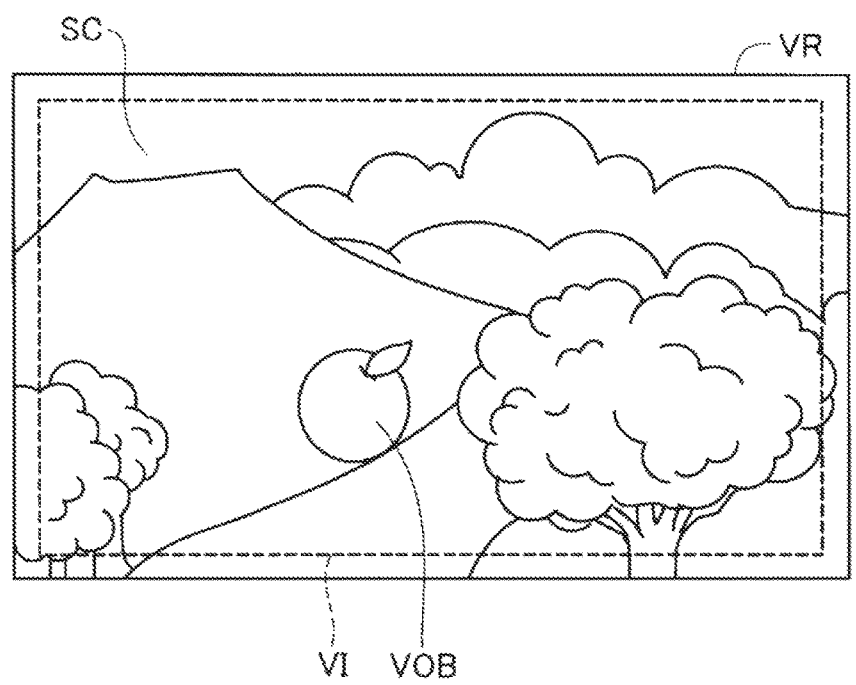

FIGS. 3A and 3B are explanatory diagrams showing examples of a virtual image visually recognized by the user. FIG. 3A illustrates a visual field VR of the user during normal display processing. The image lights guided to both the eyes of the user of the HMD 100 are focused on the retinas of the user, whereby the user visually recognizes a virtual image VI. In the example shown in FIG. 3A, the virtual image VI is a standby screen of the OS of the HMD 100. The user visually recognizes an outside scene SC through the right optical-image display unit 26 and the left optical-image display unit 28. In this way, concerning a portion where the virtual image VI is displayed in the visual field VR, the user of the HMD 100 in this embodiment can view the virtual image VI and the outside scene SC behind the virtual image VI. Concerning a portion where the virtual image VI is not displayed in the visual field VR, the user can directly view the outside scene SC through the optical-image display units.

FIG. 3B illustrates the visual field VR of the user during the augmented reality processing. In the augmented reality processing, the AR processing unit 144 generates image data representing information for additional presentation (e.g., characters and images) to be added to an object present in the real world and transmits the generated image data to the image display unit 20. "The object present in the real world" means any object included in a real environment around the user. The object present in the real world and serving as a target of the augmented reality processing is also referred to as "target object". The target object can be determined by any method. For example, all objects included in the outside scene SC visually recognized by the user may be set as target objects. Objects selected by the user out of the objects included in the outside scene SC may be set as target objects. Contents reproduced in the HMD 100 or objects selected according to an application executed in the HMD 100 may be set as target objects out of the objects included in the outside scene SC. "Adding to the object" means that information is, for example, added to or deleted from the target object, highlighted, or attenuated. Information to be, for example, added to or deleted from the target object, highlighted, or attenuated (information for additional presentation) is also referred to as "virtual object". In the example shown in FIG. 3B, an image VOB (a virtual object VOB) representing an apple is displayed as the virtual image VI to overlap a real road (the target object) included in the outside scene SC. Consequently, the user can obtain a feeling as if the apple is fallen on the road where nothing is present.

A-2. Augmented Reality Processing

Figure 4:
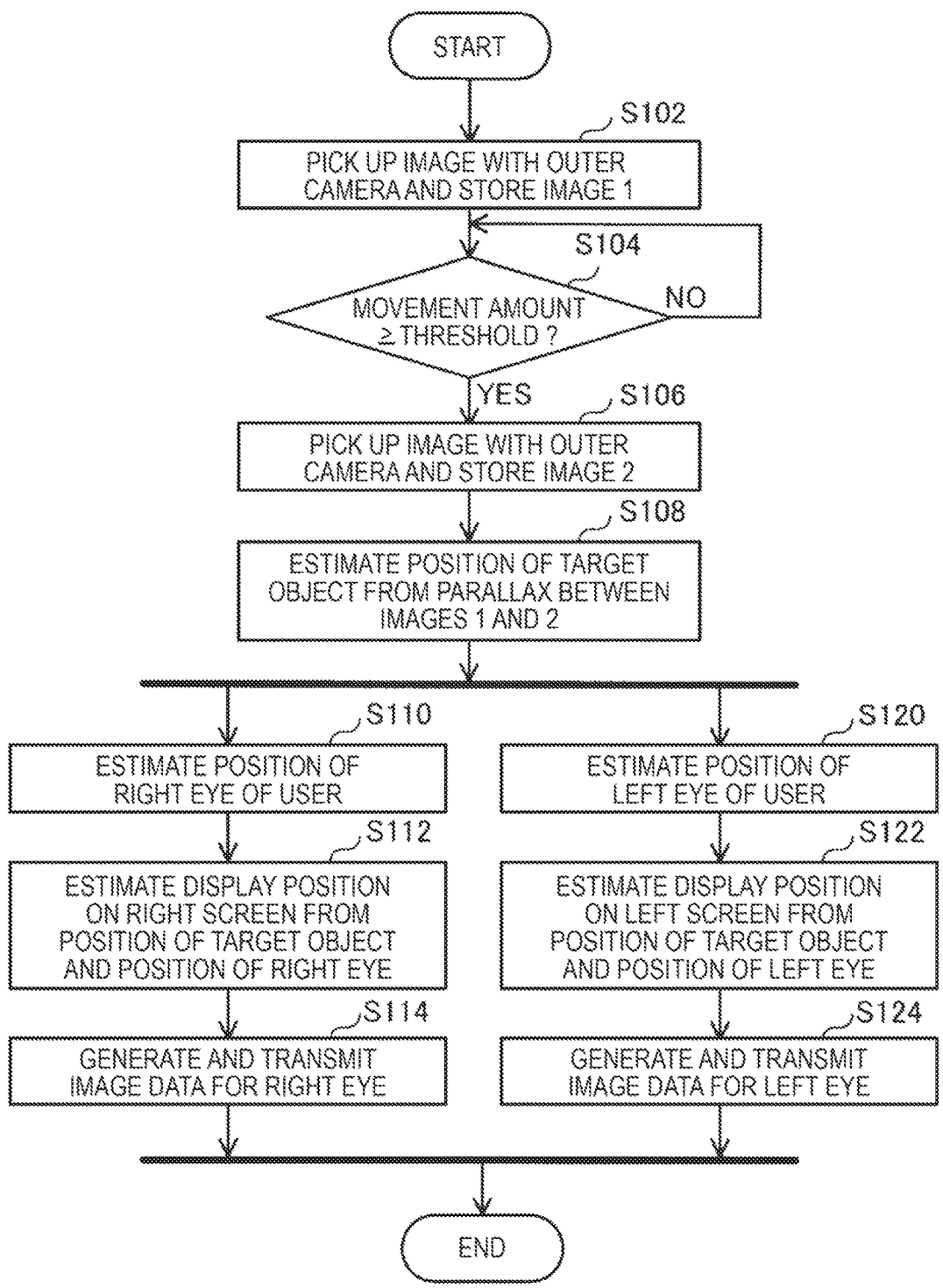
FIG. 4 is a flowchart for explaining a procedure of augmented reality processing.

FIG. 4 is a flowchart showing a procedure of the augmented reality processing. The augmented reality processing is triggered by a processing start request from the OS 150 or any application and started.

Figure 5:
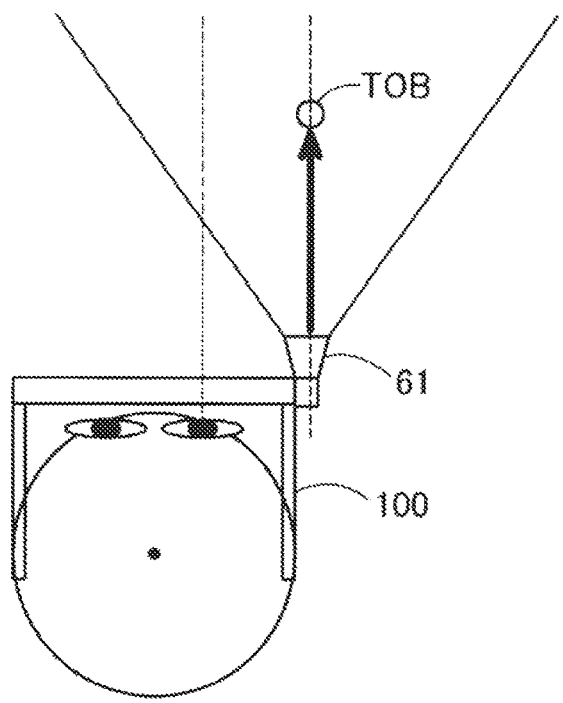
FIG. 5 is an explanatory diagram for explaining step S102 of the augmented reality processing.

FIG. 5 is an explanatory diagram for explaining step S102 of the augmented reality processing. In step S102 in FIG. 4, the position estimating unit 142 instructs the outer camera 61 to perform image pickup and acquires an outside scene image in a visual field direction of the user of the HMD 100 including the target object TOB (FIG. 5) of the augmented reality processing. The position estimating unit 142 stores the acquired outside scene image in the storing unit 120. Note that, for convenience of explanation, the outside scene image acquired in step S102 is also referred to as "image 1". The image 1 functions as "first outside scene information". For convenience of illustration, in FIGS. 5 to 7, 10, and 11, the outer camera 61 is highlighted.

Figure 6:
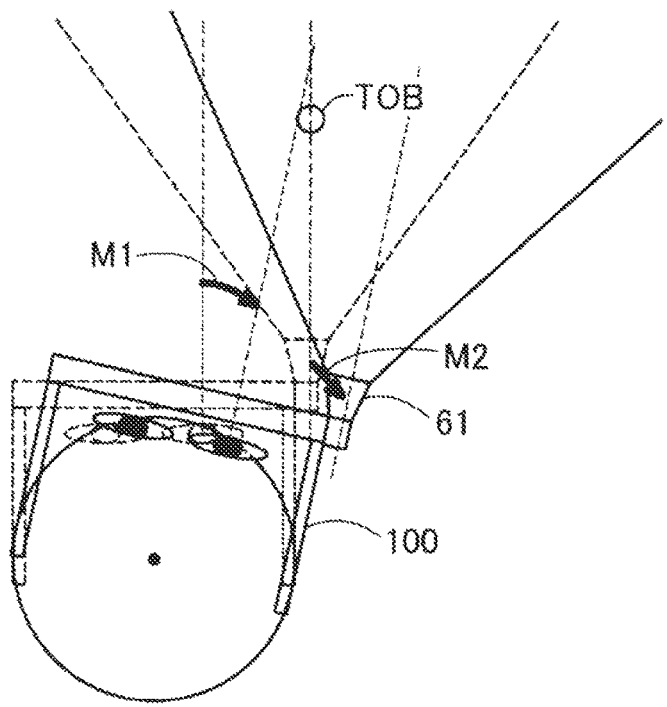
FIG. 6 is an explanatory diagram for explaining step S104 of the augmented reality processing.

FIG. 6 is an explanatory diagram for explaining step S104 of the augmented reality processing. In step S104 in FIG. 4, the position estimating unit 142 determines whether a movement amount M2 (FIG. 6) of the outer camera 61 starting from a point in time when the image 1 is acquired in step S102 is equal to larger than a threshold stored in the movement amount threshold 124. Specifically, the position estimating unit 142 repeatedly acquires motion (velocity, acceleration, angular velocity, a direction, and a change in the direction) of the head of the user of the HMD 100 from the nine-axis sensor 66. The position estimating unit 142 estimates, from an acquired rotation amount M1 of the head, the movement amount M2 of the outer camera 61 starting from the point in time when the image 1 is acquired. In this way, the position estimating unit 142 in this embodiment estimates a movement amount of the outer camera 61 using the motion of the head of the user wearing the HMD 100.

Thereafter, when the estimated movement amount M2 of the outer camera 61 is smaller than the threshold of the movement amount threshold 124 in step S104 in FIG. 4, the position estimating unit 142 transitions the processing to step S104 and continues monitoring of the movement amount M2. On the other hand, when the estimated movement amount M2 of the outer camera 61 is equal to or larger than the threshold of the movement amount threshold 124, the position estimating unit 142 transitions the processing to step S106.

Figure 7:
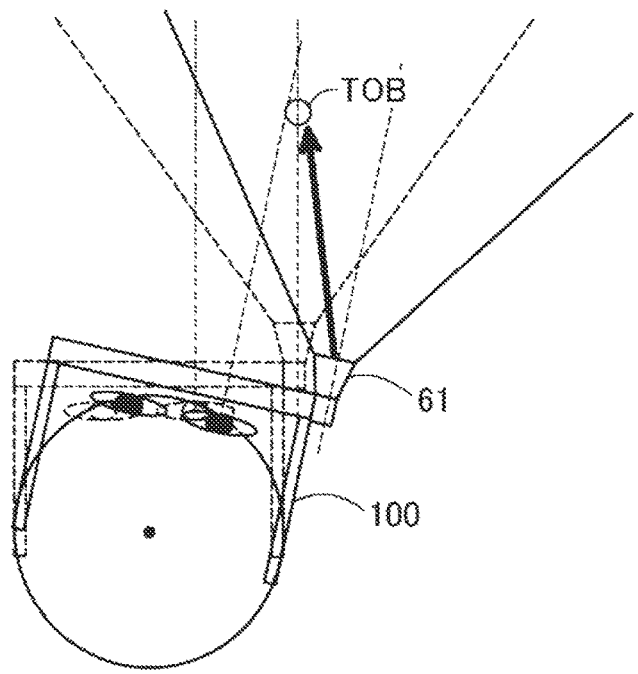
FIG. 7 is an explanatory diagram for explaining step S106 of the augmented reality processing.

FIG. 7 is an explanatory diagram for explaining step S106 of the augmented reality processing. In step S106 of FIG. 4, the position estimating unit 142 instructs the outer camera 61 to perform image pickup and acquires an outside scene image in a visual field direction of the user of the HMD 100 including the target object TOB (FIG. 7) of the augmented reality processing. The position estimating unit 142 stores the acquired outside scene image in the storing unit 120 in a form distinguishable from the image 1 acquired in step S102. Note that, for convenience of explanation, the outside scene image acquired in step S106 is also referred to as "image 2". The image 2 functions as "second outside scene information".

In step S108 in FIG. 4, the position estimating unit 142 estimates the position of the target object with respect to the outer camera 61 from a parallax between the image 1 and the image 2 using a technique of stereo image processing. Note that the "position" to be estimated by the position estimating unit 142 includes a distance between the HMD 100 and the target object and a direction of the target object with respect to the HMD 100. Specifically, the position estimating unit 142 can estimate the position of the target object TOB with respect to the outer camera 61 as explained below.

Figure 8:
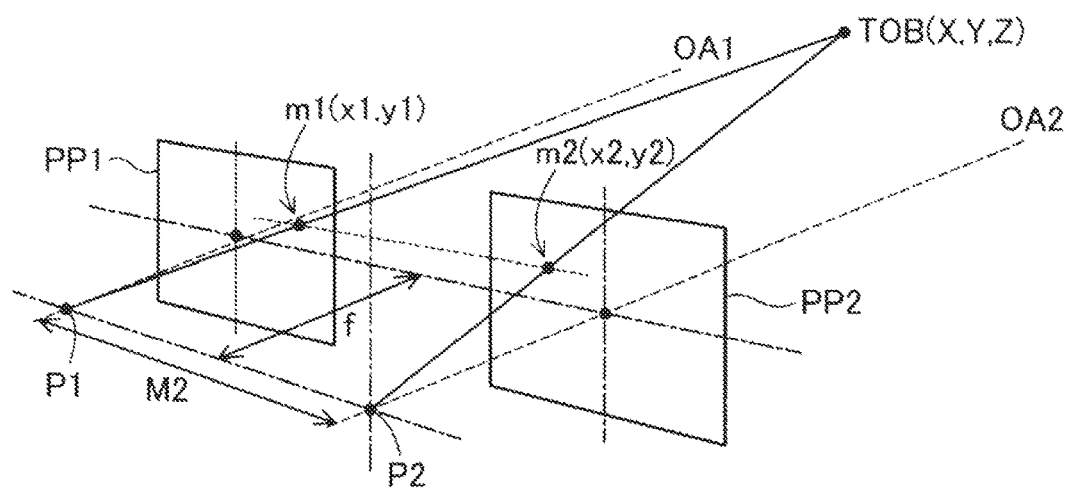
FIG. 8 is an explanatory diagram for explaining step S108 of the augmented reality processing.
Figure 9:
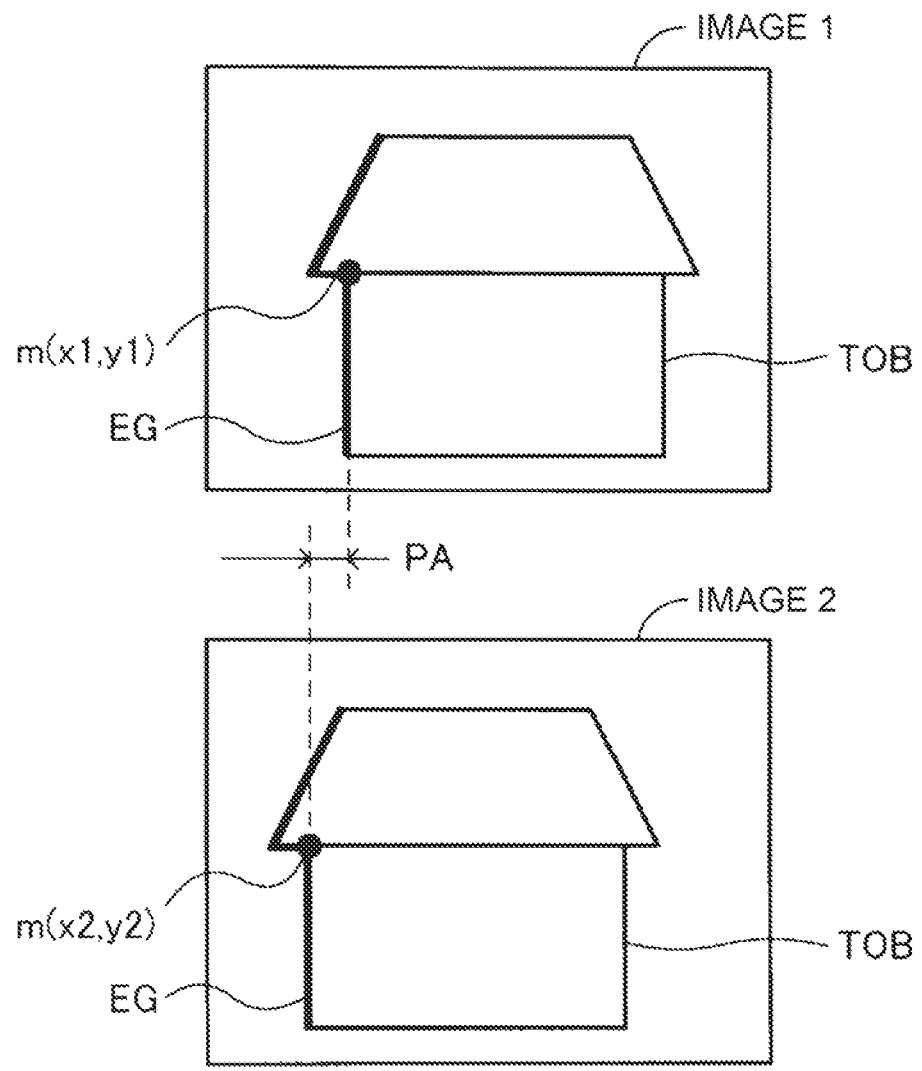
FIG. 9 is an example an image 1 and an image 2.

FIG. 8 is an explanatory diagram for explaining step S108 of the augmented reality processing. FIG. 9 is an example of the image 1 and the image 2. In FIG. 8, a focal point of image pickup of the image 1 is represented as P1 and a focal point of image pickup of the image 2 is represented as P2. A projection point of the target objet TOB on an image pickup surface PP1 of the image 1 is represented as m(x1, y1) and a projection point of the target object TOB on an image pickup surface PP2 of the image 2 is represented as m(x2, y2). Further, a point on a real space of the target object TOB is represented as TOB (X, Y, Z). OA1 represent a parallel optical axis of the outer camera 61 in step S102. OA2 is a parallel optical axis of the outer camera 61 in step S106.

Movement of the outer camera 61 involved in rotation of the head of the user is movement in the horizontal direction. Therefore, in the above explanation, y1=y2. In this case, the point TOB (X, Y, Z) on the real space of the target object TOB, the projection point m(x1, y1) of the target object TOB of the image 1, and the projection point m(x2, y2) of the target object TOB of the image 2 can be represented by Expressions 1 to 3 below.

$$Z=(M2 \times f)/(x1-x2) \quad (1)$$

$$X=(Z/f) \times x2 \quad (2)$$

$$Y=(Z/f) \times y2 \quad (3)$$

The distance between the focal point P1 and the focal point P2 can be regarded as the movement amount M2 of the outer camera 61. The distance f between the focal point P1 and the image pickup surface PP1 and the distance f between the focal point P2 and the image pickup surface PP2 are a focal length of the outer camera 61 stored in the focal length 122 in advance.

Therefore, first, the position estimating unit 142 measures a parallax PA (x1-x2) (FIG. 9) between the image 1 and the image 2. The position estimating unit 142 can calculate the point TOB (X, Y, Z) on the real space of the target object TOB using the measured parallax PA, Expressions 1 to 3, the movement amount M2, and the focal length f of the focal length 122. Note that a reference point for measuring the parallax PA can be arbitrarily set. For example, the position estimating unit 142 can set an edge EG (FIG. 9) of the target object as the reference point for measuring the parallax PA. In general, an edge can be simply calculated by an algorithm of edge detection known in general (an algorithm for specifying a part where the brightness of an image acutely changes). The edge is often detected as a set (a line) of continuous points. Therefore, in this way, the position estimating unit 142 can accurately calculate a parallax between the images 1 and 2 compared with when one point is set as a reference point. Note that the edge functions as a "feature".

Figure 10:
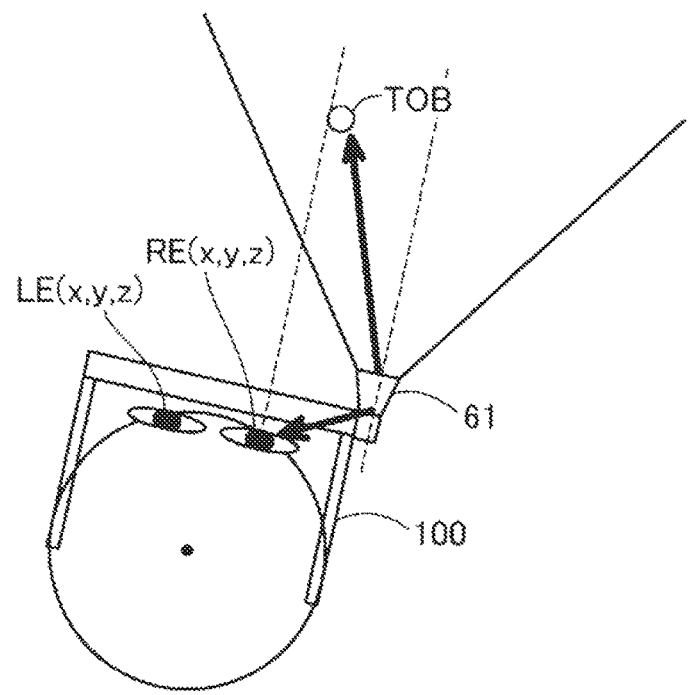
FIG. 10 is an explanatory diagram for explaining step S110 of the augmented reality processing.

FIG. 10 is an explanatory diagram for explaining step S110 of the augmented reality processing. In step S110 in FIG. 4, the position estimating unit 142 estimates a position of the right eye RE (FIG. 10) of the user with respect to the outer camera 61. Specifically, the position estimating unit 142 instructs the inner camera 62 to perform image pickup and acquires an image of the eyes of the user. The position estimating unit 142 estimates a position RE(x, y, z) of the right eye RE of the HMD 100 with respect to the outer camera 61 on the basis of the size of the right eye RE of the user obtained by analyzing the obtained image of the eyes.

Figure 11:
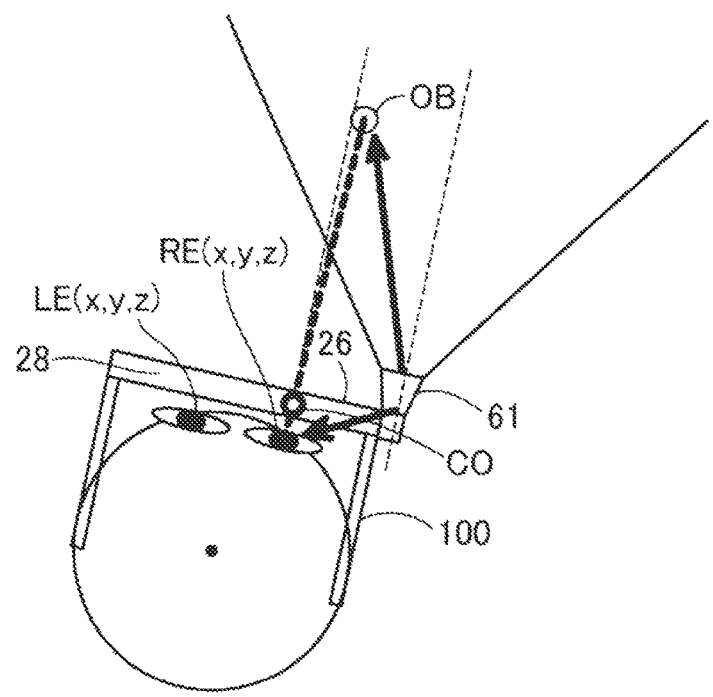
FIG. 11 is an explanatory diagram for explaining step S112 of the augmented reality processing.

FIG. 11 is an explanatory diagram for explaining step S112 of the augmented reality processing. In step S112 in FIG. 4, the position estimating unit 142 estimates a display position of a virtual object on a right screen from the position of the target object TOB and the position of the right eye RE. Specifically, the position estimating unit 142 calculates a coordinate CO of the right optical-image display unit 26 corresponding to an extended line of the position TOB (X, Y, Z) of the target object TOB estimated in step S108 and the position RE (x, y, z) of the right eye RE of the user estimated in step S110.

In step S114 in FIG. 4, the position estimating unit 142 transmits the coordinate CO calculated in step S112 to the AR processing unit 144. The AR processing unit 144 converts the coordinate CO of the right optical-image display unit 26 into a coordinate COx of the right LCD 241. Thereafter, the AR processing unit 144 generates image data for right eye Data1 in which the virtual object is arranged in the coordinate COx and transmits the image data for right eye Data1 to the image processing unit 160. Note that the AR processing unit 144 only has to arrange the virtual object on the basis of the coordinate COx. Therefore, the AR processing unit 144 can arrange the virtual object in any place determined on the basis of the coordinate COx (e.g., a place apart from the coordinate COx by a predetermined distance).

In steps S120 to S124 in FIG. 4, the position estimating unit 142 carries out, for the left eye LE of the user, processing same as the processing explained in steps S110 to S114. That is, in step S120, the position estimating unit 142 estimates the position of the left eye LE of the user with respect to the outer camera 61. In step S122, the position estimating unit 142 estimates a display position of the virtual object on a left screen (the left optical-image display unit 28) from the position of the target object TOB and the position of the left eye LE. In step S124, the AR processing unit 144 converts a coordinate of the left optical-image display unit 28 into a coordinate of the left LCD 242, generates image data for left eye Data2 in which the virtual object is arranged in the coordinate after the conversion, and transmits the image data for left eye Data2 to the image processing unit 160.

The image processing unit 160 transmits the image data for right eye Data1 and the image data for left eye Data2 received from the AR processing unit 144 to the image display unit 20. Thereafter, the display processing explained with reference to FIG. 2 is executed, whereby, as explained with reference to FIG. 3B, the user of the HMD 100 can visually recognize a stereoscopic virtual object VOB in the visual field VR.

Note that, in the embodiment, the position estimating unit 142 estimates the position of the target object with respect to the outer camera 61 using the two images 1 and 2. However, the position estimating unit 142 may estimate the position of the target object with respect to the outer camera 61 by using three or more images. If the three or more images are used, it is possible to improve accuracy of estimation of the position of the target object.

According to the augmented reality processing, the position estimating unit 142 estimates the position of the target object TOB with respect to the outside-scene acquiring unit of the head-mounted display device (the HMD 100) on the basis of at least two kinds of outside scene information (the image 1 functioning as first outside scene information and the image 2 functioning as second outside scene information) acquired by the outside-scene acquiring unit (the outer camera 61) over time. Therefore, it is possible to provide a head-mounted display device capable of grasping the position of any target object TOB present in the real world using single outside scene information acquiring means (e.g., a monocular camera). The augmented-reality processing unit (the AR processing unit 144) causes the image display unit 20 to form, on the basis of the estimated position of the target object TOB, the virtual image VI representing the virtual object VOB to be added to the target object TOB. Therefore, it is possible to reduce a deviation between the target object TOB, which is the object in the real world, and the virtual object VOB displayed as the virtual image.

Further, according to the augmented reality processing, it is possible to improve accuracy of the estimation of the position TOB(X, Y, Z) of the target object TOB in the position estimating unit 142. For example, as explained in the embodiment, when a movement amount of the outside-scene acquiring unit (the outer camera 61) is equal to or larger than the predetermined amount (the movement amount threshold 124), the position estimating unit 142 acquires the second outside scene information (the image 2). Then, if the predetermined amount (the movement amount threshold 124) is designed as appropriate, the position estimating unit 142 can estimate the position TOB(X, Y, Z) of the target object TOB using the outside scene information (the image 1) in which the difference (the parallax PA, FIG. 9) in the feature (the edge) of the outside scene included in the outside scene information is large and the second outside scene information (the image 2).

Further, according to the augmented reality processing, the position estimating unit 142 can estimate the movement amount M2 (FIG. 6) of the outside-scene acquiring unit (the outer camera 61) using the motion (the rotation amount M1) of the head of the user and acquire the second outside scene information (the image 2). Therefore, the position estimating unit 142 can estimate the position TOB (X, Y, Z) of the target object TOB using the difference (parallax PA, FIG. 9) in the feature (the edge) of the outside scene included in the first and second outside scene information (the images 1 and 2) caused when the user moves the head.

Further, according to the augmented reality processing, the augmented-reality processing unit 144 determines the position of the virtual object VOB on the basis of the positions of the optical-image display units (the right optical-image display unit 26 and the left optical-image display unit 28) corresponding to extended lines of the position TOB (X, Y, Z) of the target object TOB and the positions (RE(x, y, z) and LE(x, y, z)) of the eyes of the user. That is, the augmented-reality processing unit 144 can determine the position of the virtual object VOB on the basis of the position of the target object TOB visually recognized by the user through the optical-image display units. As a result, the augmented-reality processing unit 144 can display, in a position where the user does not feel a sense of discomfort, the virtual object VOB to be added to the target object TOB.

Further, according to the augmented reality processing, the position estimating unit 142 can estimate the positions (RE (x, y, z) and LE (x, y, z)) of the eyes of the user with respect to the outside-scene acquiring unit (the outer camera 61) of the head-mounted display device (the HMD 100) on the basis of the image of the eyes acquired by the eye-image acquiring unit (the inner camera 62). The eye-image acquiring unit is arranged near the outside-scene acquiring unit. Therefore, it is possible to improve accuracy when the position estimating unit 142 estimates the positions of the eyes of the user.

B. Second Embodiment

In a second embodiment of the invention, a configuration is explained in which an acquisition trigger for the second outside scene information in the position estimating unit is varied. In the following explanation, only sections having components and operations different from those in the first embodiment are explained. Note that, in the figures, components same as those in the first embodiment are denoted by reference numerals and signs same as those in the first embodiment. Detailed explanation of the components is omitted. The components and steps denoted by reference numerals and signs same as those in the first embodiment in the figures are the same as those in the first embodiment.

B-1. Configuration of a Head-mounted Display Device

Figure 12:
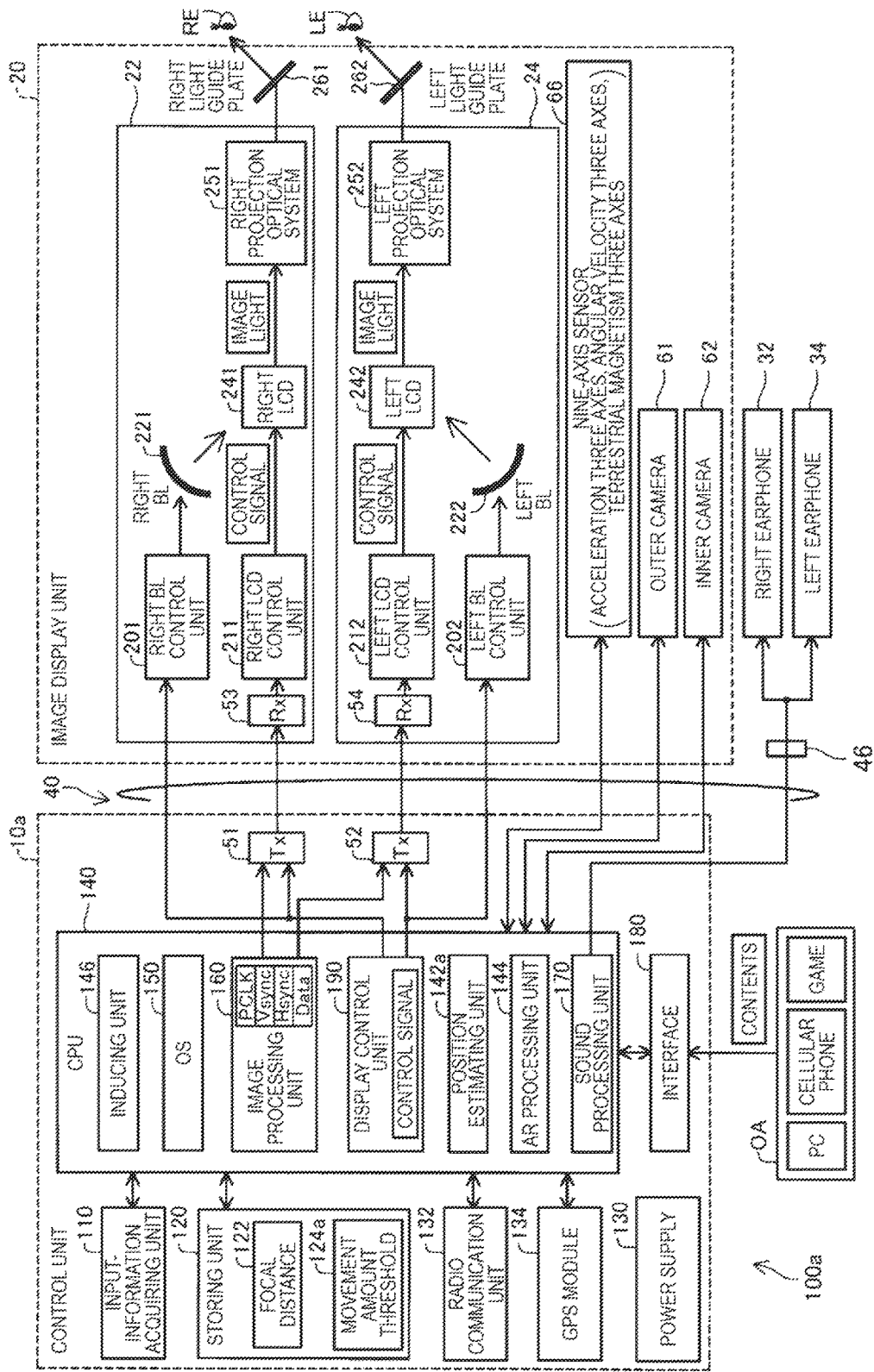
FIG. 12 a block diagram functionally showing the configuration of an HMD in a second embodiment.

FIG. 12 is a block diagram functionally showing the configuration of an HMD 100a in a second embodiment. The HMD 100a is different from the HMD 100 in the first embodiment shown in FIG. 2 in that the HMD 100a includes a control unit 10a instead of the control unit 10. The control unit 10a includes a movement amount threshold 124a instead of the movement amount threshold 124, includes a position estimating unit 142a instead of the position estimating unit 142, and further includes an inducing unit 146.

In the movement amount threshold 124a, two threshold (a first threshold and a second threshold) used in augmented reality processing in the second embodiment are stored in advance. The first threshold is a threshold representing "a movement amount of the outer camera 61" as in the first embodiment. The second threshold is a threshold representing "a difference between features of an outside scene". Note that the first and second thresholds stored in the movement amount threshold 124a may be changeable by a user. The position estimating unit 142a is different from the position estimating unit 142 in the first embodiment in processing content in the augmented reality processing. The inducing unit 146 causes the image display unit 20 to form a virtual image for inducing motion of the user in the augmented reality processing.

B-2. Augmented Reality Processing

Figure 13:
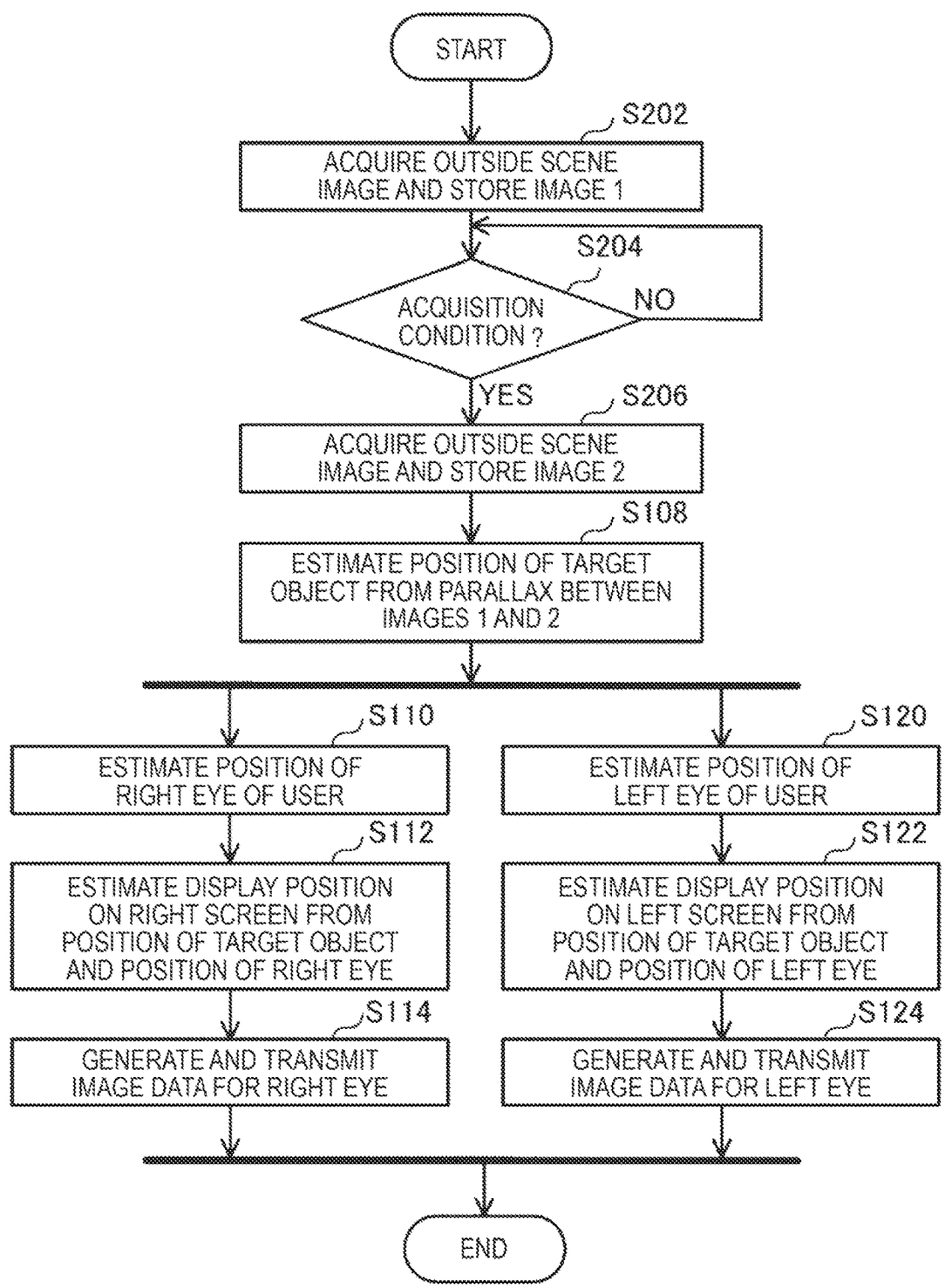
FIG. 13 is a flowchart for explaining a procedure of augmented reality processing in the second embodiment.

FIG. 13 is a flowchart for explaining a procedure of the augmented reality processing in the second embodiment. The augmented reality processing is different from the augmented reality processing in the first embodiment shown in FIG. 4 in that the augmented reality processing includes steps S202 to S206 instead of the steps S102 to S106.

In step S202, the position estimating unit 142a acquires an outside scene image picked up by the outer camera 61 (an outside scene image in a visual field direction of the user of the HMD 100a including the target object TOB of the augmented reality processing shown in FIG. 5) picked up by the outer camera 61. In this embodiment, the outer camera 61 is configured to repeatedly pick up an outside scene image irrespective of an instruction of the position estimating unit 142a. Therefore, in this step, the position estimating unit 142a acquires one outside scene image at a point in time when step S202 is executed out of outside scene images repeatedly picked up. Note that, as in the first embodiment, the position estimating unit 142a may instruct the outer camera 61 to perform image pickup. The position estimating unit 142a stores the acquired outside scene image in the storing unit 120 as the "image 1". The image 1 functions as a "first outside scene image".

In step S204, the position estimating unit 142a determines whether an acquisition condition for the next outside scene image holds. Details of the acquisition condition are explained below. When the acquisition condition does not hold (NO in step S204), the position estimating unit 142a monitors whether the acquisition condition holds.

When the acquisition condition holds (Yes in step S204), in step S206, the position estimating unit 142a acquires one outside scene image at a point in time when step S206 is executed out of the outside scene images repeatedly picked up by the outer camera 61. The position estimating unit 142a stores the acquired outside scene image in the storing unit 120 as the "image 2". The image 2 functions as a "second outside scene image".

Subsequent processing is the same as the processing in the first embodiment explained with reference to FIG. 4.

"The acquisition condition for the next outside scene image" in step S204 in FIG. 13 is explained. The acquisition condition in this embodiment is conditions "a" and "b" explained below. The position estimating unit 142a may adopt the condition "a" alone or may adopt the condition "b" alone. The position estimating unit 142a may adopt both of the conditions "a" and "b" and determine in step S204 whether any one of the conditions "a" and "b" holds.

(a) When a movement amount of the outer camera 61 is equal to or larger than a predetermined amount (b) When a difference between features of an outside scene included in the outside scene information is equal to or larger than a predetermined amount B-2-1. Condition "a" (when a Movement Amount of the Outer Camera 61 is Equal to or Larger than the Predetermined Amount)

When the condition "a" is adopted, the position estimating unit 142a determines whether the movement amount M2 (FIG. 6) of the outer camera 61 starting from a point in time when the image 1 is acquired in step S202 is equal to or larger than a first threshold stored in the movement amount threshold 124a. The position estimating unit 142a estimates the movement amount M2 of the outer camera 61 using at least any one of methods a1 to a3 described below. The methods a1 to a3 may be used in combination.

(a1) In the method a1, the position estimating unit 142a estimates a movement amount of the outer camera 61 from motion of the head of the user. Specifically, the position estimating unit 142a repeatedly acquires, from the nine-axis sensor 66, velocity, acceleration, angular velocity, a direction, and a change in the direction (hereinafter also collectively referred to as "acceleration and the like") involved in the motion of the head of the user of the HMD 100a.

When the motion of the head is rotational movement, the position estimating unit 142a calculates a rotation amount M1 (FIG. 6) of the head from the acquired acceleration and the like. The position estimating unit 142a calculates the movement amount M2 of the outer camera 61 from the calculated rotation amount M1 to estimate the movement amount M2 of the outer camera 61. Specifically, when the motion of the head is linear movement or curved line movement in X, Y, and Z axis directions, the position estimating unit 142a calculates a movement amount of the head from the acquired acceleration and the like. The position estimating unit 142a estimates a movement amount of the outer camera 61 regarding the calculated movement amount as the movement amount M2 of the outer camera 61. In this way, the motion of the head and the motion of the outer camera 61 include not only the rotational movement but also the liner movement and the curved line movement in the X, Y, and Z axis directions. The same applies to the methods a2 and a3 explained below. Note that, in this case, the nine-axis sensor 66 functions as the "first motion detecting unit" that detect motion of the head of the user.

As explained above, with the method a1, the position estimating unit 142a can estimate the movement amount M2 (FIG. 6) of the outside-scene acquiring unit (the outer camera 61) using the motion of the head of the user and acquire the second outside scene information (the image 2). The motion of the head of the user may be motion consciously performed by the user or may be motion unconsciously performed by the user. The position estimating unit 142a can estimate the position TOB (X, Y, Z) of the target object TOB using a difference (the parallax PA, FIG. 9) of a feature (an edge) of an outside scene included in the first and second outside scene information (the images 1 and 2) caused when the user moves the head.

(a2) In the method a2, the position estimating unit 142a estimates a movement amount of the outer camera 61 from motion of the body of the user.

Figure 14:
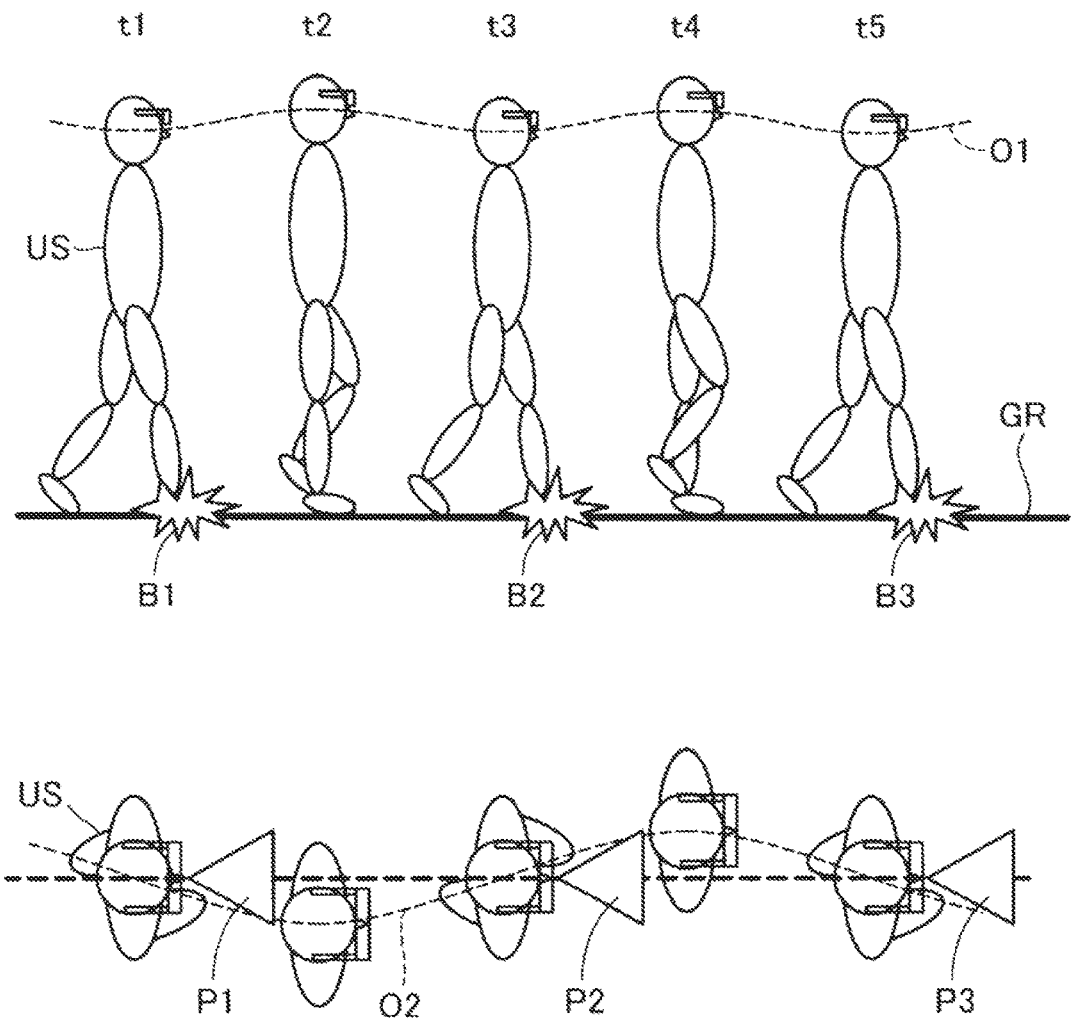
FIG. 14 is a diagram for explaining an example of step S204 (a method a2) of the augmented reality processing.

FIG. 14 is a diagram for explaining an example of step S204 (the method a2) of the augmented reality processing. In FIG. 14, the upper figure represents transition of a change in the vertical direction of the head of a user US during walking. The lower figure represents a change in the horizontal direction of the head of the user US during the walking. The position of the head of the user US during the walking cyclically changes along the vertical direction and draws a track O1 according to the elapse of time (t1 to t5) (the upper figure in FIG. 14). At the same time, the position of the head of the user US during the walking cyclically changes along the horizontal direction and draws a track O2 according to the elapse of time (t1 to t5) (the lower figure in FIG. 14). As shown at times t1, t3, and t5, when the foot of the user US lands on the ground GR, shocks B1, B2, and B3 involved in the landing occur. In this case, positions P1, P2, and P3 of the outer camera 61 move by the size of a step of the user.

The position estimating unit 142a repeatedly acquires velocity, acceleration, angular velocity, a direction, and a change in the direction (hereinafter also collectively referred to as "acceleration and the like") detected by the nine-axis sensor 66. In this case, the nine-axis sensor 66 functions as a "second motion detecting unit" that detects motion of the body of the user. The position estimating unit 142a detects the shocks B1 to B3 involved in the landing during the walking on the basis of change amounts of the acquired acceleration and the like. When a shock is detected, the position estimating unit 142a can regard a movement amount of the outer camera 61 from the last shock detection time as the size of the step of the user. Note that the size of the step of the user may be stored in the storing unit 120 in advance or may be calculated on the basis of the change amounts of the acceleration and the like. In an example of the method a2, a movement amount of the outer camera 61 is estimated in this way.

Note that the method explained above can be adopted in cases other than the landing during the walking (e.g., when the user is running, skipping, or stumbles) as long as a shock is involved in the motion of the body of the user.

Figure 15:
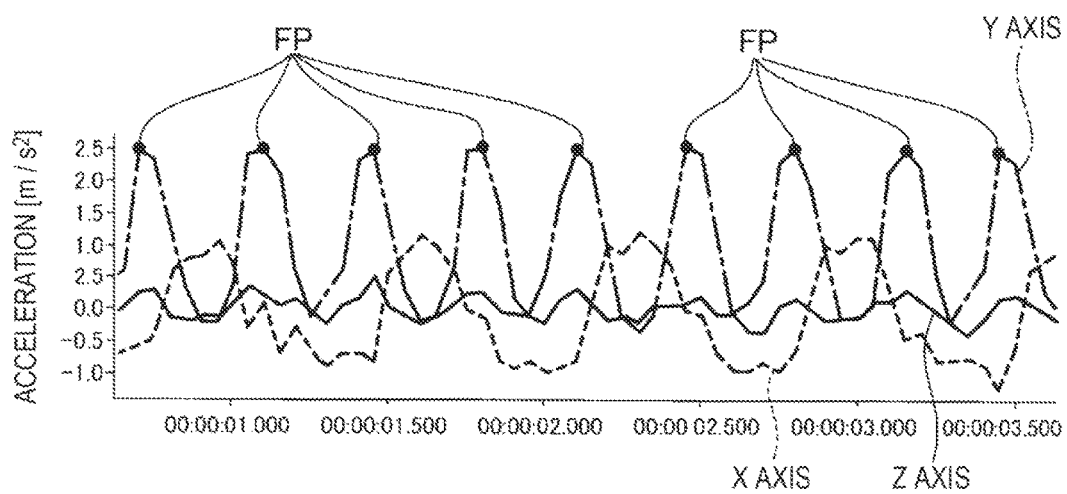
FIG. 15 is a diagram for explaining another example of step S204 (the method a2) of the augmented reality processing.

FIG. 15 is a diagram for explaining another example of step S204 (the method a2) of the augmented reality processing. In this example, the user wears a three-axis acceleration sensor on the arm separately from the HMD 100a. The three-axis acceleration sensor may be incorporated in an object worn on the arm by the user such as an arm band, a wrist watch, a bracelet, or a ring. FIG. 15 represents transition of a detection value of an acceleration sensor worn on the arm of the user during walking. The X axis represents a change in acceleration due to swing of the arm in the front-back direction (in other words, the traveling direction). The Y axis represents a change in acceleration due to swing of the arm in the up-down direction (in other words, the vertical direction). The Z axis represents a change in acceleration due to swing of the arm in the left-right direction (in other words, the horizontal direction). The accelerations on the X, Y, and Z axes due to the swings of the arm of the user during the walking cyclically change according to the elapse of time as shown in the figure.

The position estimating unit 142a repeatedly acquires acceleration detected by the acceleration sensor worn on the arm. In this case, the acceleration sensor worn on the arm functions as the "second motion detecting unit" that detects motion of the body of the user. The position estimating unit 142a detects, concerning any one of the acquired accelerations on the X, Y, and Z axes, a point having a feature (hereinafter also referred to as "feature point") in a cyclical change. For example, the position estimating unit 142a detects, as the feature point, a point FP where the acceleration on the Y axis is the highest. When the feature point is detected, the position estimating unit 142a can regard a movement amount of the outer camera 61 from the last feature point detection as the size of the step of the user. Note that the size of the step of the user may be stored in the storing unit 120 in advance or may be calculated on the basis of a change amount of acceleration. In the other example of the method a2, a movement amount of the outer camera 61 is estimated in this way.

As explained above, with the method a2, the position estimating unit 142a can estimate a movement amount of the outer-scene acquiring unit (the outer camera 61) using motion of the body of the user and acquire the second outside scene information (the image 2). The motion of the body of the user may be motion consciously performed by the user or may be motion unconsciously performed by the user. The position estimating unit 142a can estimate the position TOB (X, Y, Z) of the target object TOB using a difference (the parallax PA, FIG. 9) of a feature (an edge) of an outside scene included in the first and second outside scene information (the images 1 and 2) caused when the user moves the body.

(a3) In the method a3, the position estimating unit 142a estimates a movement amount of the outer camera 61 from present position information of the user. Specifically, the position estimating unit 142a repeatedly acquires from the GPS module 134 a change in the present position information involved in movement of the user of the HMD 100a. The position estimating unit 142a calculates a movement amount of the outer camera 61 from an acquired change amount of the present position information. In this case, the GPS module 134 functions as a "present-position acquiring unit" that acquires present position information of the user.

Note that a change in the present position information of the user may be acquired by a method other than the GPS module 134. For example, the position estimating unit 142a may calculate the present position information of the user according to self-contained navigation or may receive the present position information of the user from a vehicle-mounted GPS module.

As explained above, with the method a3, the position estimating unit 142a can estimate a movement amount of the outer camera 61 using the present position information of the user and acquire the second outside scene information (the image 2). The movement of the user (the change in the present position) may be movement consciously performed by the user or may be movement unconsciously performed by the user. In this way, even in the HMD 100a not including a component that detects motion of the user (motion of the head or motion of the body), the position estimating unit 142a can acquire the second outside scene information (the image 2).

As explained above, if the condition "a" (the movement amount of the outer camera 61 is equal to or larger than the predetermined amount) is adopted as the acquisition condition in step S204, it is possible to improve accuracy of estimation of the position of the position TOB(X, Y, Z) of the target object TOB in the position estimating unit 142a. For example, as explained in the embodiment, when the movement amount of the outside-scene acquiring unit (the outer camera 61) is equal to or larger than the predetermined amount (the first threshold of the movement amount threshold 124a), the position estimating unit 142a acquires the second outside scene information (the image 2). Then, if the predetermined amount (the first threshold of the movement amount threshold 124a) is designed as appropriate, the position estimating unit 142a can estimate the position TOB (X, Y, Z) of the target object TOB using the first outside scene information (the image 1) in which a difference (the parallax PA, FIG. 9) of a feature (an edge) of an outside scene included in the outside scene information is large and the second outside scene information (the image 2).

Note that, in the methods a1 to a3, the inducing unit 146 may cause the image display unit 20 to form a virtual image for inducing motion of the user (motion of the head, motion of the body, and movement of the present position).

Figure 16:
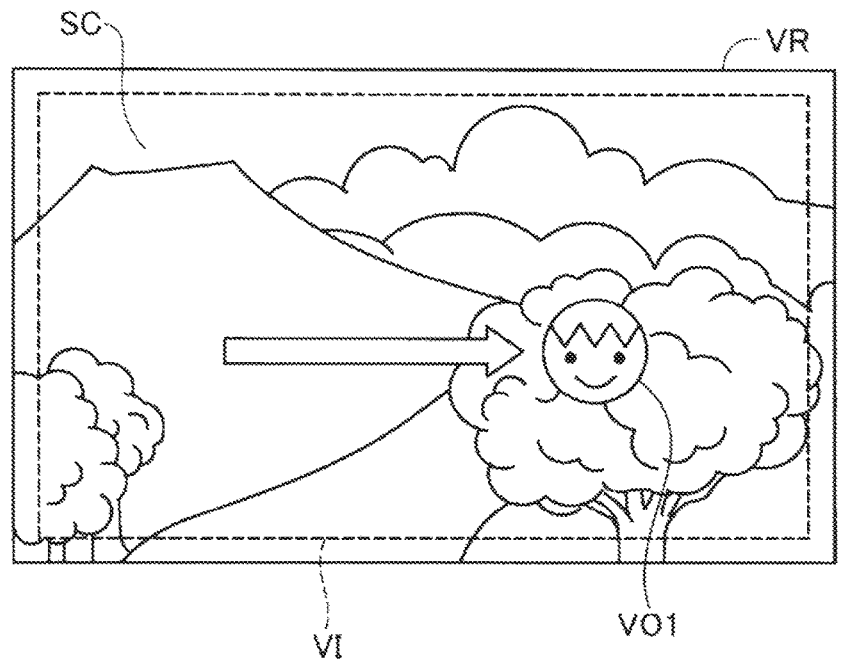
FIG. 16 is a diagram showing an example of a virtual image for inducing motion of a user.

FIG. 16 is a diagram showing an example of the virtual image VI for inducing motion of the user. For example, the inducing unit 146 moves the object VO1 for attracting attention of the user from one end to the other end of the visual field VR. The object VO1 may be an image or may be a character string. The object VO1 is preferably an image or a character string, the hue, the brightness, the chroma, the size, and the like of which are adjusted, to make it easy to attract attention of the user. In the example in FIG. 16, the image VO1 imitating a human face is moved from the left end to the right end of the visual field VR. Consequently, the inducing unit 146 can induce motion of the head of the user by causing the user to track the object VO1 with the eyes.

Figure 17:
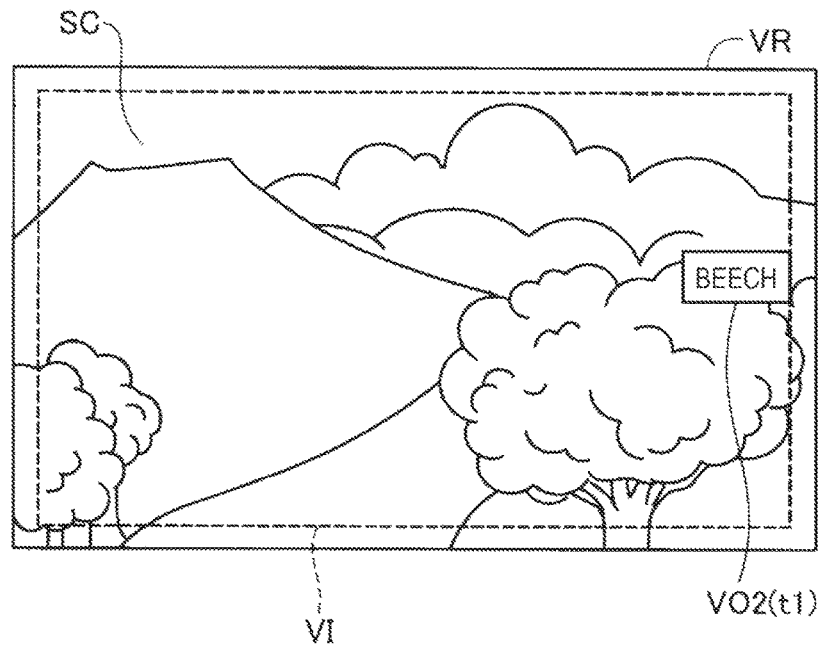
FIG. 17 is a diagram showing another example of the virtual image for inducing motion of the user.
Figure 18:
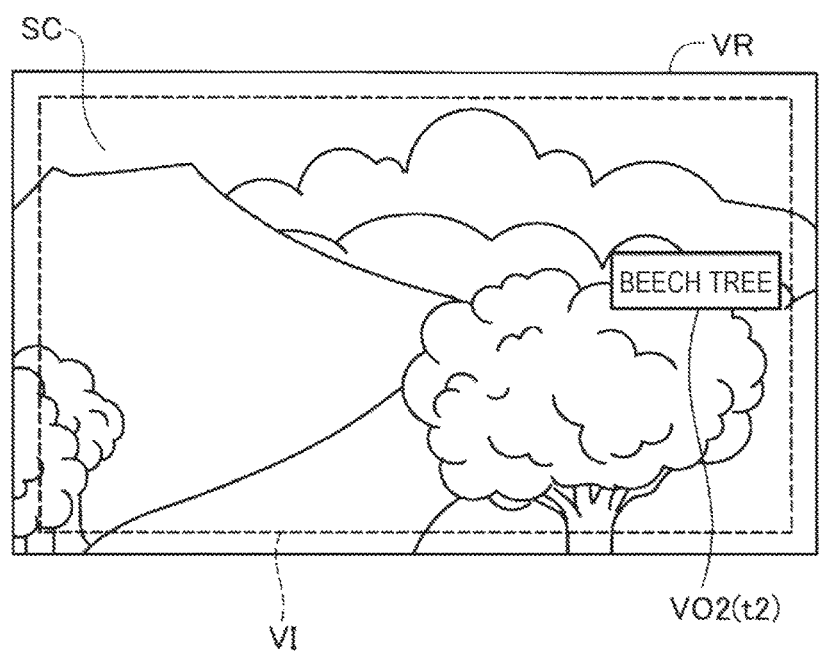
FIG. 18 is a diagram showing another example of the virtual image for inducing motion of the user.

FIGS. 17 and 18 are diagrams showing another example of the virtual image VI for inducing motion of the user. FIG. 17 shows the virtual image VI at time t1. FIG. 18 shows the virtual image VI at time t2 after the time t1. For example, as shown in FIG. 17, the inducing unit 146 displays, in an incomplete form, a virtual object VO2 to be added to a target object TO2. In the example in FIG. 17, a character string "beech tree", which is a virtual object to be added to a tree, is displayed in a partially cut incomplete shape. Consequently, the inducing unit 146 can induce motion of the head of the user by causing the user to trace the incomplete object VO2 with the eyes. In the example in FIG. 18, when the user rotates the head and shifts the visual field VR to the right, the character string of the virtual object "beech tree" to be added to the tree is displayed in a complete form.

The inducing unit 146 may cause the image display unit 20 to form virtual images representing images c1 to c4 explained below together with or instead of the virtual image explained above. Note that the images c1 to c4 may be still images or may be moving images.

(c1) An image for inducing motion of the head or motion of the body by frightening the user. For example, a horror image for stirring fear of the user and causing the user to turn the face (the head) or the body away and a flash image for stirring fright of the user and causing the user to turn the face (the head) or the body away.

(c2) An image for instructing motion of the user to induce motion of the head, motion of the body, and movement of the present position. For example, an image of a person performing radio calisthenics, an image of a person practicing yoga, an image of a person performing stretch, and an image of a person performing shadow boxing for causing the user to imitate motion. An image for instructing movement of the user such as "please go to XX".

(c3) An image for asking questions to induce motion of the head or motion of the body. For example, an image for asking present time and an image for asking questions concerning an environment in which the user is present.

(c4) An image for causing the user to perform a predetermined gesture or predetermined motion to induce motion of the head or motion of the body. For example, it is assumed that a function for reducing the luminance of the virtual image VI when the user looks up and increasing the luminance of the virtual image VI when the user looks down is mounted on the HMD 100a in advance. In such a case, the luminance of the virtual image VI is increased (reduced) in order to induce operation by the user.

As explained above, if the inducing unit 146 causes the image display unit 20 to form the virtual image VI for inducing motion of the user (motion of the head, motion of the body, or movement of the present position), the position estimating unit 142a can easily acquire the second outside scene information (the image 2).

B-2-2. Condition "b" (A Difference Between Features of an Outside Scene Included in the Outside Scene Information is Equal to or Larger than the Predetermined Amount)

Figure 19:
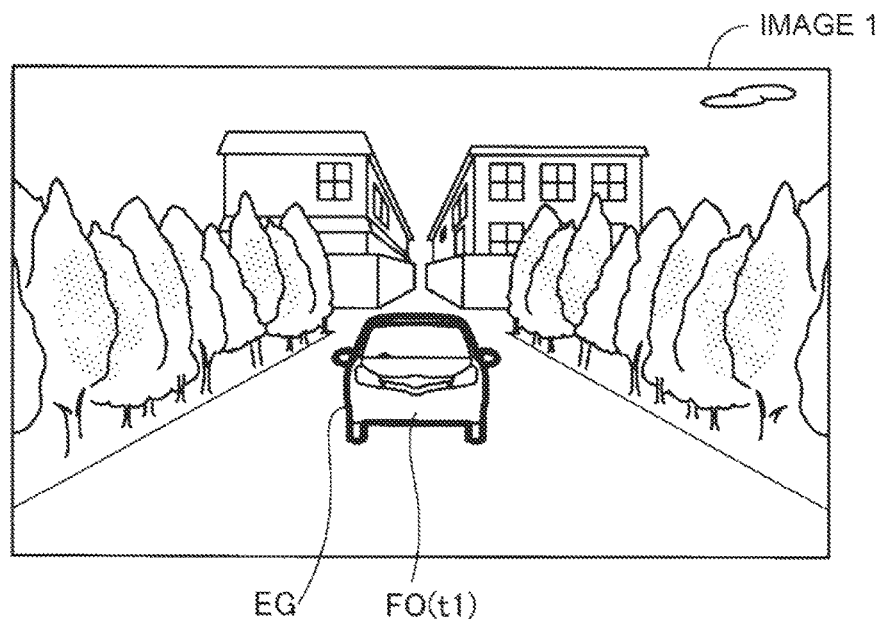
FIG. 19 is a diagram for explaining step S204 (a condition b) of the augmented reality processing.
Figure 20:
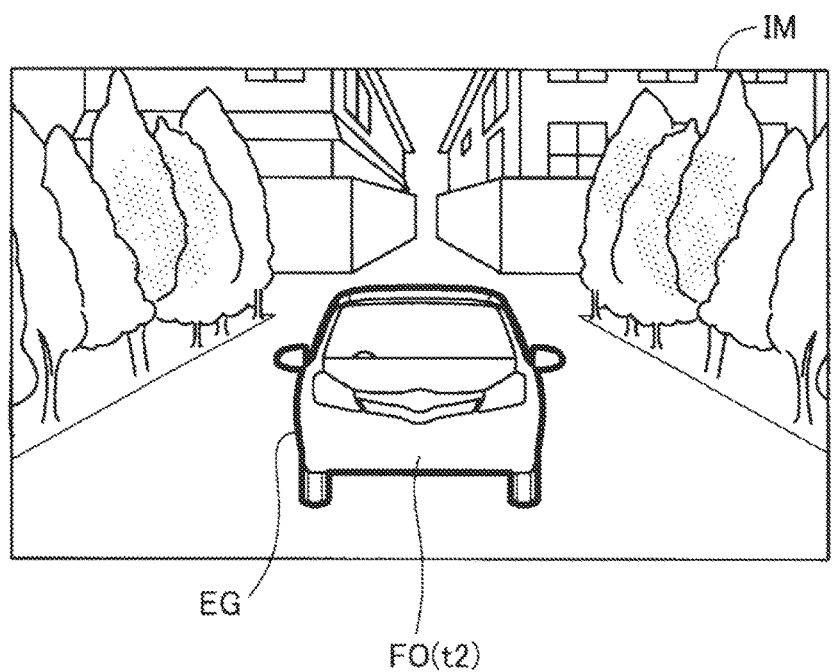
FIG. 20 is a diagram for explaining step S204 (the condition b) of the augmented reality processing.

FIGS. 19 and 20 are diagrams for explaining step S204 (the condition "b") of the augmented reality processing. The condition "b" is effective when the user of the HMD 100a does not move and a target object moves. FIG. 19 is an example of the image 1 acquired in step S202 (the time t1) of the augmented reality processing (FIG. 13) in the second embodiment. FIG. 20 is an example of an outside scene image IM picked up at the time t2 after the time t1 among external scene images repeatedly picked up by the outer camera 61.

The position estimating unit 142a detects an edge EG (a feature) of a target object FO included in the image 1 acquired in step S202 (at the time t1) and an edge EG of the target object FO included in the outside scene image IM picked up at the time t2. The position estimating unit 142a determines whether a difference between the edges is equal to or larger than the second threshold stored in the movement amount threshold 124a. Note that the position estimating unit 142a may determine a difference between edges of the target object using, for example, three or more images acquired at the times t1, t2, and t3.

As explained above, if the condition "b" (a difference between features of an outside scene included in the outside scene information is equal to or larger than the predetermined amount) is adopted as the acquisition condition in step S204, it is possible to improve accuracy of estimation of the position TOB(X, Y, Z) of the target object TOB in the position estimating unit 142a. For example, when a difference between features (edges) of an outside scene included in the outside scene information is equal to or larger than the predetermined amount (the second threshold of the movement amount threshold 124a), the position estimating unit 142a acquires the second outside scene information (the image 2). Then, if the predetermined amount (the second threshold of the movement amount threshold 124a) is designed as appropriate, the position estimating unit 142a can estimate the position TOB(X, Y, Z) of the object TOB using the first outside scene information (the image 1) in which a difference between features (edges) of an outside scene included in the outside scene information is large and the second scene information (the image 2).

As explained above, with the augmented reality processing in the second embodiment, as in the first embodiment, it is possible to provide the head-mounted display device (the HMD 100a) capable of grasping the position of any target object TOB present in the real world using single outside scene information acquiring means (e.g., a monocular camera).

Note that the HMD 100a may change, on the basis of contents being reproduced in the HMD or setting by the user, whether the condition "a" is adopted or the condition "b" is adopted, when the condition "a" is adopted, which of the method a1 to a3 is used, presence or absence of display of a virtual image for inducing motion of the user when the condition "a" is adopted, and a type of the virtual image. Consequently, it is possible to optimize conditions and the like according to the contents being reproduced and preference of the user.

C. Modifications

In the embodiment, a part of components implemented by hardware may be replaced with software. Conversely, apart of components implemented by software may be replaced with hardware. Besides, modifications explained below are also possible.

Modification 1

In the embodiment, the configuration of the HMD is illustrated. However, the configuration of the HMD can be arbitrarily set in a range not departing from the spirit of the invention. For example, addition, deletion, conversion, and the like of the components can be performed.

The allocation of the constituent elements to the control unit and the image display unit is only an example. Various forms of the allocation can be adopted. For example, forms explained below may be adopted. (i) A form in which processing functions such as a CPU and a memory are mounted on the control unit and only a display function is mounted on the image display unit, (ii) a form in which the processing functions such as the CPU and the memory are mounted on both of the control unit and the image display unit, (iii) a form in which the control unit and the image display unit are integrated (e.g., a form in which the control unit is included in the image display unit and functions as an eyeglass-type wearable computer), (iv) a form in which a smartphone or a portable game machine is used instead of the control unit, (v) a form in which the control unit and the image display unit are connected via a wireless signal transmission line such as a wireless LAN, infrared communication, or Bluetooth (registered trademark) and a connecting unit (a cord) is removed. Note that, in this case, power supply to the control unit or the image display unit may be carried out wirelessly.

For example, the configurations of the control unit and the image display unit illustrated in the embodiment can be arbitrarily changed. Specifically, for example, in the embodiment, the control unit includes the transmitting unit, and the image display unit includes the receiving unit. However, both of the transmitting unit and the receiving unit may include a function capable of performing bidirectional communication and may function as a transmitting and receiving unit. For example, a part of the interface for operation (the keys, the track pad, etc.) included in the control unit may be omitted. Another interface for operation such as a stick for operation may be included in the control unit. Devices such as a keyboard and a mouse may be connectable to the control unit such that the control unit receives inputs from the keyboard and the mouse. For example, the secondary cell is used as the power supply. However, the power supply is not limited to the secondary cell. Various cells can be used. For example, a primary cell, a fuel cell, a solar cell, or a thermal cell may be used.

Figure 21A:
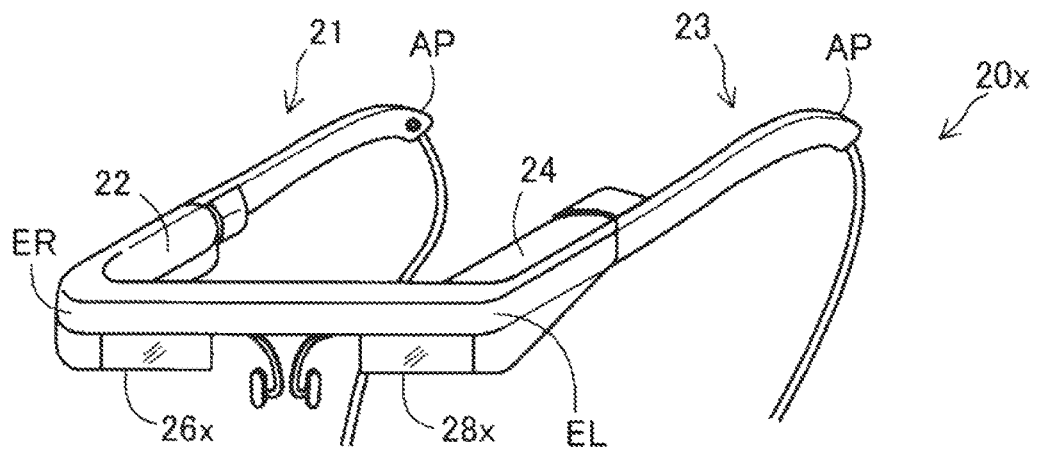
FIGS. 21A and 21B are explanatory diagrams showing the configurations of the external appearances of HMDs in a modification.
Figure 21B:
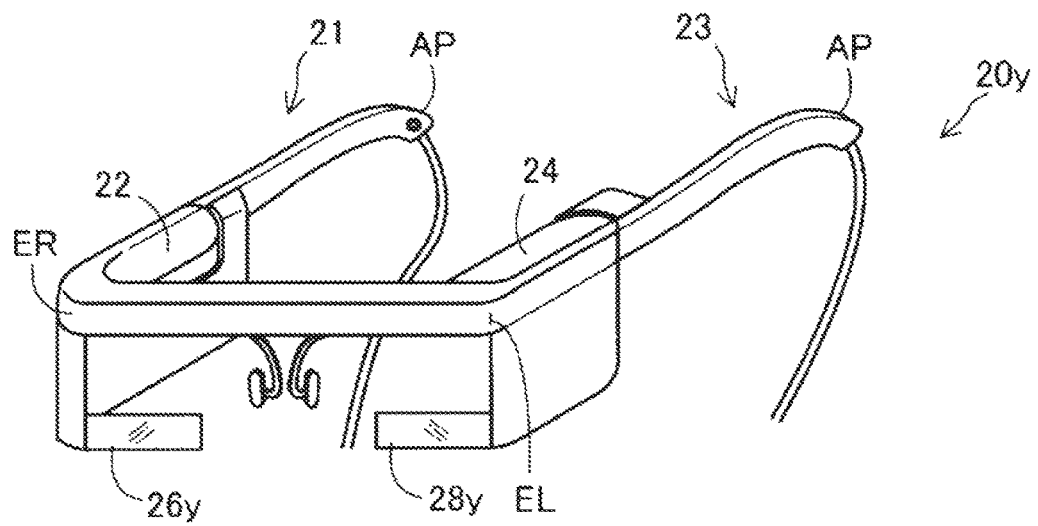

FIGS. 21A and 21B are explanatory diagrams showing the configurations of the external appearances of HMDs in a modification. In an example in FIG. 21A, an image display unit 20x includes a right optical-image display unit 26x instead of the right optical-image display unit 26 and includes a left optical-image display unit 28x instead of the left optical-image display unit 28. The right optical-image display unit 26x and the left optical-image display unit 28x are formed smaller than the optical member in the embodiment and are respectively arranged obliquely above the right eye and the left eye of the user when the user wears the HMD. In an example in FIG. 21B, an image display unit 20y includes a right optical-image display unit 26y instead of the right optical-image display unit 26 and includes a left optical-image display unit 28y instead of the left optical-image display unit 28. The right optical-image display unit 26y and the left optical-image display unit 28y are formed smaller than the optical member in the embodiment and are respectively arranged obliquely below the right eye and the left eye of the user when the user wears the HMD. In this way, the optical-image display units only have to be arranged near the eyes of the user. The size of optical members forming the optical-image display units also may be any size. The optical-image display units can also be implemented as an HMD of a form in which the optical-image display units cover only a portion of the eyes of the user, in other words, a form in which the optical-image display unit do not completely cover the eyes of the user.

For example, the processing units (e.g., the image processing unit and the display control unit) included in the control unit are described as being implemented by the CPU expanding, on the RAM, the computer program stored in the ROM or the hard disk and executing the computer program. However, these functional units may be configured using an ASIC (Application Specific Integrated Circuit) designed for implementing the functions.

For example, the HMD is the transmissive HMD of a binocular type. However, the HMD may be a HMD of a monocular type. The HMD may be a nontransmissive HMD that blocks transmission of an outside scene in a state in which the user wears the HMD. For example, as the image display unit, instead of the image display unit worn like eyeglasses, a normal display device (a liquid crystal display device, a plasma display device, an organic EL display device, a beam scanning-type display, etc.) may be adopted. In this case, as in the embodiment, the control unit and the image display unit may be connected via a wired signal transmission line or may be connected via a wireless signal transmission line. Consequently, the control unit can also be used as a remote controller of the normal display device. For example, as the image display unit, an image display unit of another shape such as an image display unit worn like a cap may be adopted instead of the image display unit worn like eyeglasses. As the earphone, an ear hook type or a headband type may be adopted. The earphone may be omitted. For example, the image display unit may be configured as a head-up display (HUD) mounted on vehicles such as an automobile and an airplane. For example, the image display unit may be configured as an HMD incorporated in body protective equipment such as a helmet or a portable hand held display (HHD). The image display unit may be combined with a nontransmissive HMD, which blocks transmission of an outside scene, and an outer camera to be configured as a video see-through HMD.

For example, in the embodiment, the image-light generating unit is configured using the backlight, the backlight control unit, the LCD, and the LCD control unit. However, the form is only an example. The image-light generating unit may include components for implementing another system in addition to the components or instead of the components. For example, the image-light generating unit may include an organic EL (organic Electro-Luminescence) display and an organic EL control unit. For example, the image generating unit can include a digital micro mirror device or the like instead of the LCD. For example, the invention can also be applied to a head-mounted display device of a laser retina projection type.

For example, in the embodiment, the configuration in which the outside-scene acquiring unit (the outer camera) is incorporated in the image display unit is illustrated. However, the outside-scene acquiring unit may be configured to be detachably attachable to the image display unit. Specifically, for example, as the outside-scene acquiring unit, a WEB camera detachably attachable to the image display unit using a clip or an attachment may be adopted. In this way, as in the embodiment, it is possible to estimate the position of the target object with respect to the outside-scene acquiring unit on the basis of at least two kinds of outside scene information acquired by the outside-scene acquiring unit over time. Note that, when the position of the target object is estimated, relative positions of the image display unit and the outside-scene acquiring unit may be taken into account. The relative positions of the image display unit and the outside-scene acquiring unit can be detected by providing displacement sensors respectively in the image acquiring unit and the outside-scene acquiring unit.

For example, in the embodiment, the example of the arrangement of the outside-scene acquiring unit (the outer camera) is explained. However, the arrangement of the outer camera can be arbitrarily changed. For example, the outer camera may be arranged in a position corresponding to the middle of the forehead of the user or may be arranged in a position corresponding to the left temple of the user. An angle of view of the outer camera can also be arbitrarily set. Note that, when the angle of view of the outer camera is set wide (e.g., 360 degrees), in the augmented reality processing, a step of extracting an outside scene image including the target object out of outside scene images obtained by the outer camera may be carried out.

Modification 2

In the embodiment, the example of the augmented reality processing is explained. However, the procedure of the processing explained in the embodiment is only an example. Various modifications are possible. For example, a part of the steps may be omitted. Other steps may be added. The order of the steps to be executed may be changed.

For example, in steps S102 and S202, the position estimating unit estimates a movement amount of the outer camera from the motion of the head of the user. However, a motion sensor may be added near the outer camera. A movement amount of the outer camera may be directly acquired using a detection value of the motion sensor.

For example, in steps S104 and S204, the position estimating unit determines, according to whether the movement amount of the outer camera is equal to or larger than the threshold stored in the movement amount threshold, whether the image 2 is acquired. However, the position estimating unit may determine, using another condition, whether the image 2 is acquired. For example, as a condition for the determination, the position estimating unit may determine whether the position of the outer camera is a position desirable in acquiring the image 2. "The position of the outer camera is a position desirable in acquiring the image 2" can be a condition that, for example, a movement amount of the outer camera is equal to or larger than a predetermined amount and the position (the height) on the y axis of the outer camera does not greatly change from the point in time when the image 1 is acquired. If the condition concerning the position (the height) on the y axis of the outer camera is added, it is possible to guarantee the premise (y1=y2) in Expressions 1 to 3.

For example, in steps S104 and S204, the position estimating unit may change, according to the velocity of motion of the user (motion of the head or motion of the body), the threshold used in step S104 or S204. In this case, a plurality of thresholds corresponding to velocities may be stored in the movement amount threshold in the storing unit to change a threshold to be used. The threshold to be used may be changed by multiplying a threshold stored in the movement amount threshold with a coefficient corresponding to velocity. Note that the velocity of the motion of the user can be detected on the basis of, for example, acceleration detected by the nine-axis sensor.

For example, in steps S104 and S204, the position estimating unit may learn a tendency of the magnitude of motion of the user (motion of the head or motion of the body) to change the threshold used in step S104 or S204.

For example, in step S108, the position estimating unit can estimate the position of the target object with respect to the outer camera from the parallax between the image 1 and the image 2 using a publicly known technique other than the stereo image processing.

For example, in step S108, the position estimating unit estimates the position of the target object with respect to the outer camera from a plurality of still images. However, the position estimating unit may estimate the position of the target object with respect to the outer camera using a moving image (a set of a plurality of still images acquired over time).

For example, in step S108, the position estimating unit detects edges included in the outside scene image as features of the outside scene. However, the features of the outside scene are not limited to the edges. For example, the position estimating unit may use a specific position (e.g., the center) of the target object or a color of the target object as a feature of the outside scene. In this case, the position estimating unit can detect, for example, with an image analysis, specific positions or colors of the target object included in the images 1 and 2.

For example, in steps S110 and S120, the position estimating unit estimates the positions of the right eye and the left eye of the user with respect to the outer camera. However, the positions of the right eye and the left eye of the user with respect to the outer camera may be stored in the storing unit. Steps S110 and S120 may be omitted. The position estimating unit may estimate the positions of the right eye and the left eye with respect to the outer camera using ultrasound or an infrared ray instead of acquiring images of the eyes with the inner camera.

For example, the processing explained as being executed by the position estimating unit in the embodiment may be executed by the augmented-reality processing unit. The processing explained as being executed by the augmented-reality processing unit in the embodiment may be executed by the position estimating unit.

For example, the augmented reality processing may be repeatedly executed. When the augmented reality processing in FIG. 4 is repeated, the HMD executes steps S102 to S114 (S124) in the first processing and executes steps S104 to S114 (S124) in the second and subsequent processing. When the augmented reality processing in FIG. 13 is repeated, the HMD executes steps S202 to S114 (S124) in the first processing and executes steps S204 to S114 (S124) in the second and subsequent processing. In these cases, the image 1 is replaced with an image n (n is an integer equal to or larger than 1) and the image 2 is replaced with an image n+1.

Modification 3

The invention is not limited to the embodiments, the examples, and the modifications explained above and can be implemented as various configurations without departing from the spirit of the invention. For example, the technical features in the embodiments, the examples, and the modifications corresponding to the technical features in the forms described in the summary can be replaced or combined as appropriate in order to solve a part or all of the problems or attain a part or all of the effects. Unless the technical features are explained in this specification as essential technical features, the technical features can be deleted as appropriate.

The entire disclosure of Japanese Patent Application No.:2014-054395, filed Mar. 18, 2014 and 2014-224114, filed Nov. 4, 2014 are expressly incorporated by reference herein.

What is claimed is:

1. A head-mounted display device comprising:
a display;
a single camera configured to acquire images that include at least part of an outside scene in a visual field direction of the user; and
a processor or an application specific integrated circuit (ASIC) configured to:
repeatedly acquire, from a motion sensor, motion information regarding a head of a user wearing the head-mounted display device; and when the motion of the head is rotational movement about the axis of the head of the user:
(A) calculate, based on acceleration information included in the acquired motion information, a rotation amount of the head starting from a point in time when the first image is acquired by the single camera;
(B) calculate, based on the calculated rotation amount of the head of the user, a rotational movement amount of the single camera starting from the point in time when the first image is acquired by the single camera;
(C) determine whether the calculated rotational movement amount of the single camera starting from the point in time when the first image is acquired by the single camera is equal to or larger than a predetermined movement amount threshold; and
(D) when the calculated rotational movement amount of the single camera starting from the point in time when the first image is acquired is equal to or larger than the predetermined movement amount threshold:
(i) instruct the single camera to acquire a second image;
(ii) estimate, on the basis of the first and second images, a position of a real world target object present in the outside scene; and
(iii) cause the display to display a virtual image including a virtual object added to the real world target object at the estimated position of the real world target object.

2. The head-mounted display device according to claim 1, further comprising the motion sensor, wherein the motion sensor is configured to detect motion of the head of the user, wherein the processor or ASIC is configured to estimate the movement amount of the single camera based on the motion of the head detected by the motion sensor.

3. The head-mounted display device according to claim 2, wherein the motion sensor is a first motion sensor, and the processor or ASIC is configured to estimate the movement amount of the single camera from the motion of the body detected by a second motion sensor configured to detect motion of a body of the user.

4. The head-mounted display device according to claim 2, wherein the processor or ASIC is further configured to cause the display to form the virtual image as a virtual image for inducing motion of the user.

5. The head-mounted display device according to claim 1, wherein the processor or ASIC is further configured to:
acquire present position information of the user, and
estimate the movement amount of the camera based on the acquired present position information.

6. The head-mounted display device according to claim 1, wherein the processor or ASIC is further configured to estimate the position of the real world target object using the first and second images based on a difference between features of the outside scene included in the first and second images, respectively.

7. The head-mounted display device according to claim 1, wherein the processor or ASIC is further configured to:
calculate a parallax between the outside scene included in the first image and the outside scene included in the second image, and
estimate the position of the real world target object using the calculated parallax, the movement amount of the single camera, and a focal length of the single camera.

8. The head-mounted display device according to claim 7, wherein the processor or ASIC is further configured to:
calculate the parallax with reference to an edge of the real world target object included in the outside scene included in the first image and an edge of the real world target object included in the outside scene included in the second image.

9. The head-mounted display device according to claim 1, wherein
the display is an optical-image display that is configured to form the virtual image in front of an eye of the user, and
the processor or ASIC is further configured to:
calculate a position of the optical-image display corresponding to an extended line of the estimated position of the real world target object and the position of the eye of the user, and
determine a position of the real world target object on the basis of the calculated position of the optical-image display.

10. The head-mounted display device according to claim 1, wherein the processor or ASIC is further configured to:
estimate the position of the real world target object based on a difference of an edge of the outside scenery included in the first and second images, respectively.

11. The head-mounted display device according to claim 1, wherein the repeatedly acquired motion information includes one or more of: a velocity, an acceleration, an angular velocity, a direction, and a change in the direction.

12. The head-mounted display device according to claim 9, wherein the single camera is a first camera that is an outer camera, the head-mounted display device further comprises a second camera that is an inner camera that acquires an image of the eye of the user, and the processor or ASIC is further configured to:
analyze the image of the eye acquired by the inner camera to acquire a size of the eye of the user, and
estimate a position of the eye of the user on the basis of the acquired size of the eye.

13. The head-mounted display device according to claim 12, wherein the inner camera is arranged near the outer camera.

14. A method of controlling a head-mounted display device, comprising:
acquiring, via a single camera of the head-mounted display device, a first image that includes at least part of an outside scene in a visual field direction of the user;
repeatedly acquiring, by a processor or application specific integrated circuit (ASIC) of the head-mounted display device via a motion sensor, motion information regarding a head of a user wearing the head-mounted display device; and when the motion of the head is rotational movement about the axis of the head of the user:
(A) calculating, by the processor or ASIC based on acceleration information included in the acquired motion information, a rotation amount of the head starting from a point in time when the first image is acquired by the single camera;
(B) calculating, by the processor or ASIC, based on the calculated rotation amount of the head of the user, a rotational movement amount of the single camera starting from the point in time when the first image is acquired by the single camera;
(C) determining, by the processor or ASIC, whether the calculated rotational movement amount of the single camera starting from the point in time when the first image is acquired by the single camera is equal to or larger than a predetermined movement amount threshold; and
(D) when the calculated rotational movement amount of the single camera starting from the point in time when the first image is acquired is equal to or larger than the predetermined movement amount threshold:
(i) instructing, by the processor or ASIC, the single camera to acquire a second image of at least part of the outside scene;
(ii) estimating, by the processor or ASIC, on the basis of the first and second images, a position of a real world target object present in the outside scene; and
(iii) causing, by the processor or ASIC, a display of the head-mounted display device to display a virtual image including a virtual object added to the real world target object at the estimated position of the real world target object.

15. A non-transitory computer readable medium comprising computer-executable instructions, that, when executed by a processor, cause the processor to: acquire, by a single camera of a head-mounted display device, a first image that includes at least a part of an outside scene in a visual field direction of the user;
repeatedly acquire, from a motion sensor of the head-mounted display device, motion information regarding a head of a user wearing the head-mounted display device; and when the motion of the head is rotational movement about the axis of the head of the user:
(A) calculate, based on acceleration information included in the acquired motion information, a rotation amount of the head starting from a point in time when the first image is acquired by the single camera;
(B) calculate, based on the calculated rotation amount of the head of the user, a rotational movement amount of the single camera starting from the point in time when the first image is acquired by the single camera;
(C) determine whether the calculated rotational movement amount of the single camera starting from the point in time when the first image is acquired by the single camera is equal to or larger than a predetermined movement amount threshold; and
(D) when the calculated rotational movement amount of the single camera starting from the point in time when the first image is acquired is equal to or larger than the predetermined movement amount threshold:
(i) instruct the single camera to acquire a second image;
(ii) estimate, on the basis of the first and second images, a position of a real world target object present in the outside scene; and
(iii) cause a display of the head-mounted display device to display a virtual image including a virtual object added to the real world target object at the estimated position of the real world target object.

\* \* \* \* \*